SINGLE CHANNEL CHARACTER SENSING APPARATUS

Original Filed Dec. 30, 1963 10 Sheets-Sheet 1

INVENTORS
DAVID L. NOBLE
DOUGLAS R. ANDREWS

April 25, 1967 D. R. ANDREWS ET AL 3,316,536

SINGLE CHANNEL CHARACTER SENSING APPARATUS

Original Filed Dec. 30, 1963

April 25, 1967 D. R. ANDREWS ET AL 3,316,536

SINGLE CHANNEL CHARACTER SENSING APPARATUS

Original Filed Dec. 30, 1963 10 Sheets-Sheet 3

April 25, 1967 D. R. ANDREWS ET AL 3,316,536

SINGLE CHANNEL CHARACTER SENSING APPARATUS

Original Filed Dec. 30, 1963 10 Sheets-Sheet 4

April 25, 1967 D. R. ANDREWS ET AL 3,316,536

SINGLE CHANNEL CHARACTER SENSING APPARATUS

Original Filed Dec. 30, 1963 10 Sheets-Sheet 9

April 25, 1967 D. R. ANDREWS ET AL 3,316,536

SINGLE CHANNEL CHARACTER SENSING APPARATUS

Original Filed Dec. 30, 1963 10 Sheets-Sheet 10

United States Patent Office 3,316,536

Patented Apr. 25, 1967

3,316,536

SINGLE CHANNEL CHARACTER SENSING APPARATUS

Douglas R. Andrews, Rochester, Minn., and David L. Noble, Monte Sereno, Calif., assignors to International Business Machines Corporation, New York, N.Y., a corporation of New York Continuation of application Ser. No. 334,232, Dec. 30, 1963. This application June 8, 1966, Ser. No. 556,245
15 Claims. (Cl. 340—146.3)

This is a continuation of application Ser. No. 334,232 filed on Dec. 30, 1963. Application Ser. No. 334,232 has been abandoned. This invention relates to character recognition apparatus and more specifically to apparatus for reading characters written in human language and obtaining therefrom identifiable sequences of pulses uniquely related thereto.

The value of machines capable of directly converting human language characters into machine language characters without the need for intermediate transcribing steps has long been appreciated in the art. By "human language characters" is meant symbols that convey information and are recognizable by their shape and orientation in contradistinction to symbols comprising permutations and combinations of key elements employed to convey information. Morse code and punched paper tape code are examples of the latter type information symbols frequently used to convey information; whereas, letters of the alphabet and numbers are illustrative of the former type of information symbol which, incidentally, are employed much more frequently in every day communications carried out via the medium of paper. Character recognition machines are, in part, responsible for the recent surge in use of automatic data processing equipment. Prior applications of such equipment, which require inputs in machine language, have been limited in the respect that human language data from documents, such as bank checks, inventory cards, etc., have first had to be transcribed by human beings to machine language before usable with such equipment. This has in the past involved taking the human language data and converting it first into a pattern of holes in a punch card or paper tape, or magnetically coding it on magnetic tape. This type of data transcription is tedious, and hence, has been the source of much difficulty in the art in that errors frequently occurred in transcribing, operators become easily fatigued, the monotony of the work produced a relatively high rate of operator turnover, etc. The net effect of all these difficulties attributable to the requirement of data transcription to put human language data into machine language data was to hinder the otherwise normal growth in the use of automatic data processing machines in everyday business activities.

With the advent of character recognition machines many of the above-mentioned problems engendered by the requirement of transcription were obviated in whole or in part with the result that data processing is experiencing expansion in areas heretofore felt to be impractical. However, as with all major technological advances, many new problems are created which must be remedied if the full benefits of the advance are to be realized. As expected, this was found to be true with character recognition apparatus recently introduced.

One of the difficulties encountered was that the printing machines used to print the characters on the documents were not capable of printing, without undue expense and difficulty, characters that when read would yield character signals free of distortion. To print characters having the degree of perfection necessary to produce distortionless character signals would be time consuming, require expensive printing equipment, and generally would not be economically feasible. Therefore, in view of the fact that uniform characters lacking substantial imperfections could not be printed on a practical basis, character recognition apparatus if to be useful and reliable would have to be capable of recognizing character signals which have been subjected to various types of distortion presently to be described. By "character signal" is meant the analogue signal derived from scanning an entire character.

The first type of distortion that the character recognition apparatus must be able to cope with is that attributable to dimensional variations in the character itself. If a character is wider than it should be, the resulting character signal will necessarily be longer than properly sized, standard width character signals. Such sizing variations introduce timing problems in operating the character recognition appartus. Generally, the timing of the character recognition apparatus is synchronized with the speed of document travel. Hence, under ideal conditions, i.e., with no character dimensional errors, for a given distance of document travel a specified portion of the character will traverse the sensing station of the character recognition apparatus thereby producing a signal of known and predictable length. This signal will then be processed by the character recognition apparatus according to a predetermined timing scheme predicated on the ideal, dimensionally accurate character as a standard of reference. However, if the character is dimensionally inaccurate, e.g., wider than it should be, the signal produced will be correspondingly longer, and hence, timing discrepancies are introduced.

The same type of character signal distortion noted above frequently occurs when the document feeding means is used as a basis for synchronizing document travel with the timing of the character recognition apparatus. If there is slippage between the document and its associated feeding means, the character signal will necessarily be longer than it should be due to the fact that the character requires an abnormally long period of time to pass the character sensing station.

A second type of distortion that the character recognition apparatus must be able to cope with is that which results due to the variations from character to character in thickness of ink deposit, density of ink, thickness of document, and degree of wear. All of these factors introduce amplitude variations in the character signals which must be compensated for if the characters are to be reliably recognized.

A third type of distortion that the character recognition apparatus must be able to cop with is that introduced by the presence on the document of stray ink deposits due to incontrolled ink splatter. These unavoidable imperfections introduce distortion into the resultant character signals in the form of noise, the effects of which must be mitigated in order to reliably recognize characters.

Prior art attempts to produce character recognition apparatus capable of coping with the above-noted types of distortion have not been entirely successful, and the limited success which has been achieved has been accompanied by one or more of the following disadvantages: high cost, complex equipment, and low speeds.

It is an object of this invention to obviate the above-mentioned shortcomings of the prior art.

It is another object of this invention to provide an improved apparatus for reliably converting human language into machine language.

It is still another object of this invention to provide improved apparatus for converting human language into machine language without the intervention of transcribers.

Yet another object of this invention is to provide novel, simple and useful apparatus for converting human language into a form from which suitable utilization by automatic devices may be made.

A further object of this invention is to provide an improved apparatus for converting human language characters into a useful form notwithstanding dimensional inaccuracies in character form, ink thickness variation, random ink voids and splatter, and other character printing imperfection.

While a still further object of this invention is to provide improved apparatus for enhancing character signals.

Still another object of this invention is to provide an improved apparatus for converting human language into a useful form which derives information from the character using optical sensing means.

A still further object of this invention is to provide an improved apparatus for converting human language into a useful form which derives information from the character using magnetic sensing means.

Therefore, in accordance with one aspect of our invention we provide apparatus for converting human language characters divided into a plurality of parallel zone strips into a useful form, said apparatus including a character sensing station for deriving from each character a characteristic signal comprising a sequence of zone signals, a multiplier for multiplying each zone signal by a correlation signal to thereby enhance it, and a classifying unit for classifying the integral of said enhanced signal on the basis of its value.

In accordance with another aspect of our invention, we provide apparatus for converting human language characters divided into a plurality of parallel zone strips into useful form, said apparatus including a character sensing station for deriving from each character a characteristic signal comprising a sequence of zone signals, a multiplier for multiplying each zone signal by a correlation signal to thereby enhance it, means for performing the equivalent of a division of the integral of the enhanced zone signal by the integral of the absolute value of the zone signal, and a classifying unit for classifying the resultant quotient on the basis of its value.

In accordance with still another aspect of our invention, we provide apparatus for converting human language characters divided into a plurality of parallel zone strips into useful form, said apparatus including a character sensing station for deriving from each character a characteristic signal comprising a sequence of zone signals, a multiplier for multiplying each zone signal by a correlation signal to thereby enhance it, means for performing the equivalent of a division of the integral of the enhanced zone signal by the integral of the absolute value of the zone signal, and a classifying unit for classifying the resultant quotient on the basis of its value providing the integral of the absolute value of the zone signal bears a predetermined relationship to the first zone peak signal.

In accordance with a still further aspect of our invention, we provide apparatus for converting human language characters divided into a plurality of parallel zone strips into a useful form, said apparatus including a character sensing station for deriving from each character a characteristic signal comprising a sequence of zone signals, a multiplier for multiplying the major portion of each zone signal by a correlation signal to thereby enhance it, an integrator for integrating the resultant product, a retimer for reinitiating the integration of the resultant product in response to the beginning of a zone signal, the preceding zone signal of which was longer than standard zone signals.

An advantage of our invention is that the above-mentioned objects have been achieved without resort to relatively complex and costly equipment.

Another advantage of our invention is that human language characters are converted into machine language with improved reliability.

Still another advantage of our invention is that the properties of analogue character signals are enhanced by processing with our apparatus without a corresponding improvement in the printed characters themselves.

A still further advantage of our invention is that in the processing of zone signals, the effects of previous timing errors are not carried over to subsequent zone signal classifications.

Yet another advantage of our invention is that a large number of different human language characters are capable of being converted into useful form.

While still another advantage of our invention is that human language characters may be converted into a useful form with a minimum expenditure of time and expense.

The foregoing and other objects, features, and advantages of our invention will be apparent from the following more particular description of a preferred embodiment, as illustrated in the accompanying drawings.

In the drawings wherein like reference numerals refer to like parts throughout the several views, FIGS. 1*a* to 1*n* depict a series of characters and their associated character signals illustrative of the type which may be converted into useful form in accordance with the invention;

FIGS. 2*a* and 2*b* depict a series of waveforms which are present at various points in the block diagram of the preferred embodiment;

GENERAL

Figure 1A:
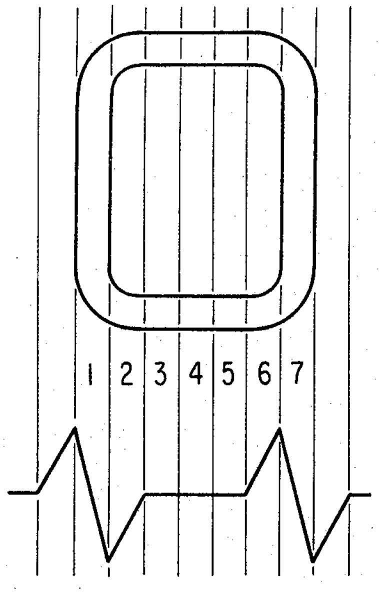
Figure 1B:
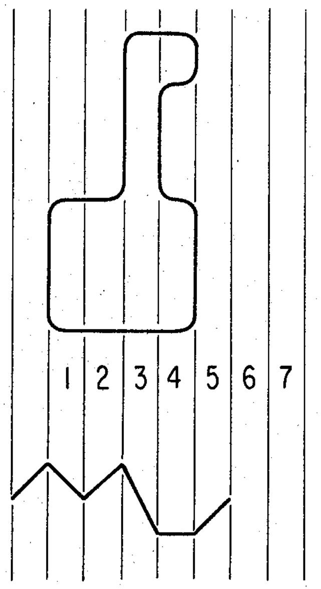
Figure 1C:
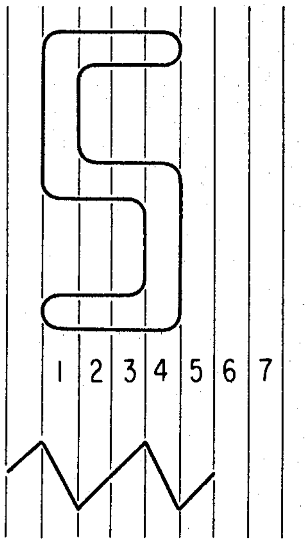
Figure 1D:
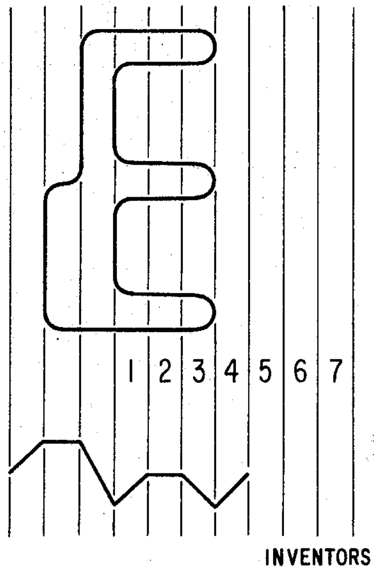
Figure 1E:
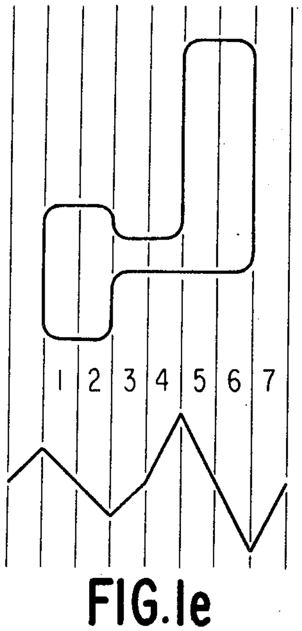
Figure 1F:
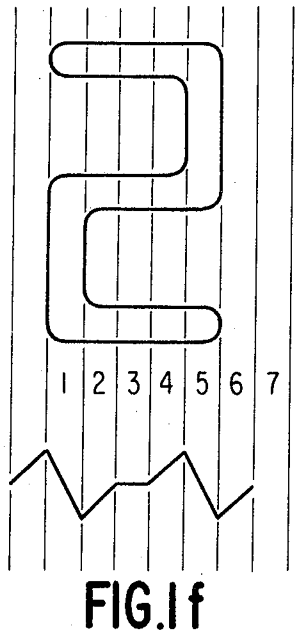

*Preferred embodiment.*—Briefly described, the present invention contemplates the provision of apparatus for the generation for each character scanned of a series of signals which are uniquely related to the character scanned and which can be used in conjunction with suitable character identifying apparatus to identify the character. Referrings to FIG. 3, it will be seen that this apparatus comprises a document feeder (not shown) for passing the document 2 bearing the magnetic characters (not shown) past a single gap character sensing station 3 where a signal characteristic of the particular character scanned is obtained. The characters are arbitrarily apportioned, it will be observed by referring to FIGS. 1*a*–1*n*, into a plurality of parallel contiguous strips, herein referred to as "zones," and hence the character signal obtained comprises a sequence of zone signals, each zone signal being derived from a single character zone. Due to the design of the characters, the amount of inked area presented to the magnetic reading head 8 is substantially constant throughout any particular zone; however, it need not, and usually is not, constant from zone to zone. The zone signals which ideally are either positive going, negative going, or zero in value, are fed to a suitable multiplier 24 where they are sequentially multiplied by correlation signals sequentially generated by a correlation signal generator 25 in an effort to enhance the properties of the zone signals and render them readily classifiable with respect to "overall" zone slope. This enhancing procedure will be explained more fully hereinafter. By "overall" zone slope is meant the underlying slope of the zone signal for a particular zone taking into account sporadic and unpredictable instantaneous variations in the slope which might occur throughout the zone due to printing imperfections, etc. The enhanced zone signals produced by the multiplier 24 are then sequentially fed to an integrator 32 and a zone signal classifying unit 30 where they are integrated and classified on the basis of the value of the integral, positive values being ascribed a "+1" zone value, negative values being ascribed a "−1" zone value, and zero values being ascribed a "0" zone value. The sequence of zone values derived from the character scanning operation is uniquely related to the particular character scanned, and hence, provides a means by which the character may be identified and further converted into machine language or operated on in other manners depending on the particular needs.

A further refinement of the above-described apparatus involves the provision of additional means for compensating for signal amplitude variations due to different thicknesses of the ink deposit printed on paper, variations in magnetization, density of ink, etc. Even though the wave shapes of the character signals will be substantially similar, in order to avoid erroneous results due to amplitude variations, "normalizing" apparatus is employed. Of course, if consistently uniform magnetization, ink density printing, etc., can be obtained the inclusion of "normalizing" apparatus may not be required. The normalizing apparatus comprises an integrator 36 which integrates once per zone the absolute value of the zone signal. This integral serves as an indicator of the relative strength of the zone signal and is fed to the zone signal classifying unit 30 where it is utilized as a factor to reduce the enhanced zone signal integral to one which is substantially independent of fluctuations in amplitude produced by varying magnetization, ink consistency, etc. In the zone signal classifying unit 30, the value of the enhanced zone signal integral, due to the inclusion of dividing means therein, is reduced an amount proportional to the absolute zone signal integral. Thus, the result achieved by utilizing the normalizing apparatus, the mitigation of the effects of amplitude level fluctuations in zone signals caused by varying magnetization, ink consistency, etc., is produced by dividing the enhanced zone signal integrals by the absolute zone signal integrals.

A still further refinement of the above described apparatus involves the provision of apparatus to mitigate the effects due to noise introduced by stray deposits of ink caused by ink splattering. Such noise if not compensated for will cause random signals derived from the splattered ink to be processed and a zone value produced where in fact no zone signal is present. To avoid such inaccuracies, additional apparatus is provided in the zone signal classifying unit 30 for comparing the value of the zone signal peak for the first zone, which is stored in a storage device 44, with the absolute zone signal integral generated by integrator 36. If a favorable comparison results, i.e., if the integral of the absolute zone signal held in storage device 44 exceeds the first zone signal peak by a predetermined amount, the zone value of interest will be presumed to be derived from a true zone signal in contradistinction to a mere random ink deposit which inadvertently is present on the document and which has no informational significance.

A still further refinement of the above described apparatus involves the provision of apparatus for compensating for zone signal distortion due to the variations in zone width produced by document slippage during the reading operation, printing imperfections, etc. Such distortion, if uncompensated for, produces longer width zone signals, the effect of which is to introduce inaccuracies in the zone value determinations. To provide for the reduction of such inaccuracies, apparatus including a zone peak comparator 70, AND gates 74 and 76, OR gate 78, and a retime enabling pulse generator 72 are provided for resetting the enhanced zone signal integrator 32 and the absolute zone signal integrator 36 to zero and to restart the integrating process for a particular zone when the zone signal from the previous zone is wider than the ideal zone signal width, i.e., wider than it would be had the previous zone been of standard width. Provision of such resetting apparatus prevents timing errors introduced by irregular width zones from being propagated from zone to zone throughout the entire character.

The preceding discussion was concerned with the apparatus of the preferred embodiment which is utilized to convert characters into a useful form. The discussion immediately to follow will highlight some of the features of the characters which are subject to conversion by the apparatus of the preferred embodiment.

Figure 1G:
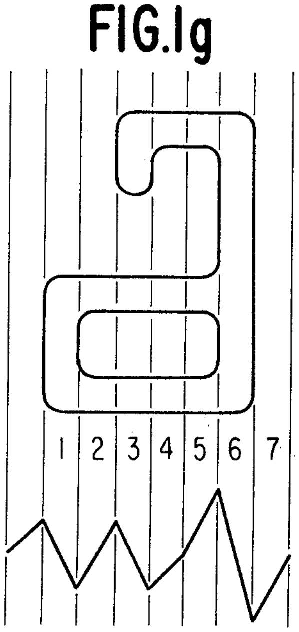
Figure 1H:
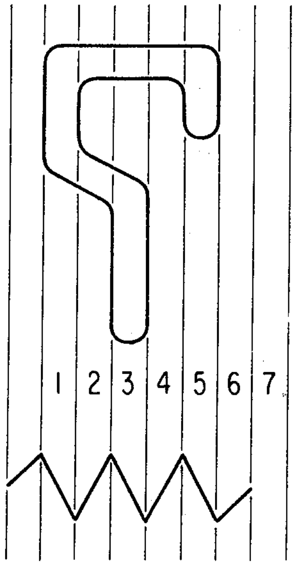
Figure 1I:
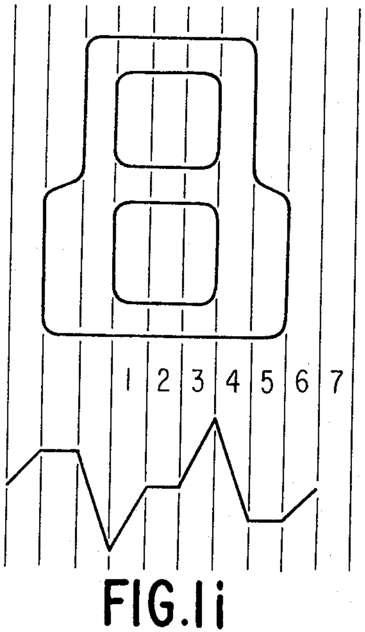
Figure 1J:
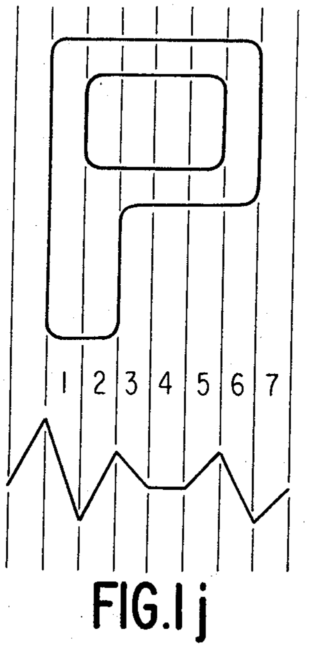
Figure 1K:
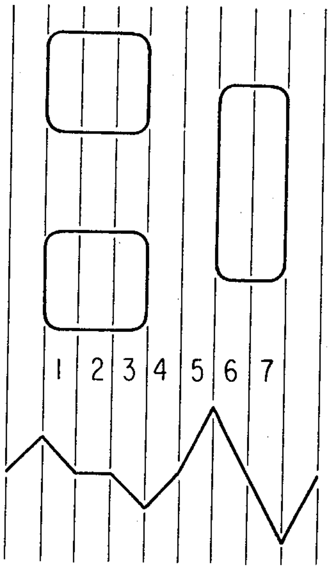
Figure 1L:
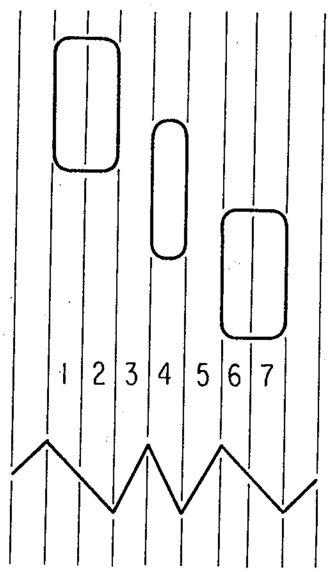
Figure 1M:
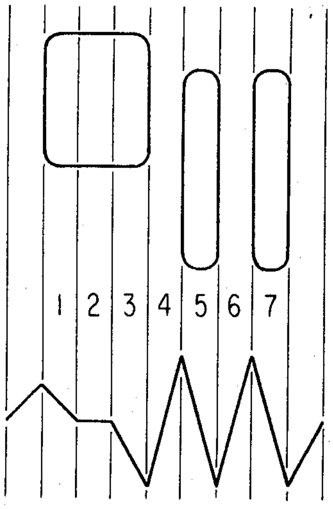
Figure 1N:
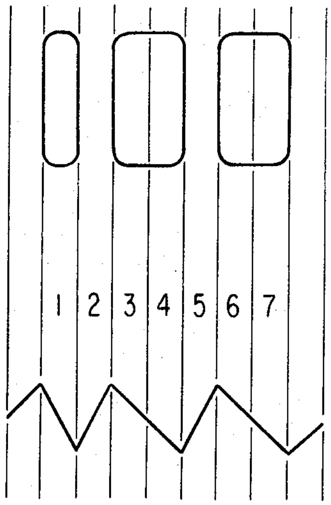

*Characters.*—Referring now to FIGS. 1*a*–1*n* sketches are provided of characters exemplary of those which can be converted into useful form in accordance with the apparatus of this invention. Included in these figures are sketches of characters written in human language as well as other miscellaneous characters having any desired meaning, which are depicted in FIGS. 1*a*–1*j* and 1*k*–1*n*, respectively. While the only human language characters which have been depicted are the numerals 0–9, it will be understood that the principles of our invention apply equally to letters of the alphabet. The characters shown are designed to produce particularly characteristic waveforms when fed past a suitable character sensing station. To accomplish this, each character as designed includes a plurality of parallel zone strips, each of which contains a substantially constant amount of darkened area. However, the amout of darkened area from zone to zone usually, although not always, will be subject to variations as a traversal across the character is made at the character sensing station.

Now that the apparatus of the preferred embodiment has been generally described as well as the characters upon which it operates, attention will be directed to the apparatus used to derive a character signal from these characters so that the apparatus of the preferred embodiment can convert it into a useful form.

*Character signals.*—Derivation of the character signals which are shown accompanying each of the characters depicted in FIGS. 1*a*–1*n* may be accomplished using a number of different devices. For example, if the characters are written with a commercially available magnetic ink, the characters may be magnetized by passing them in the vicinity of a permanent horseshoe-shaped magnet or D.C. write head, and then past a single magnetic reading head. The orientation of a single magnetic read head with respect to the magnetized characters should be such that the gap of the magnetic read head will be substantially parallel to the zone strips and in magnetic flux linking relationship thereto. The direction of feed of the magnetized characters with respect to the magnetic read head should be such that the zones of the character sequentially pass adjacent the magnetic head. The length of the gap of the magnetic read head as well as that of the permanent magnet or D.C. write head should exceed the length of the zone strips which comprise the character to insure that the entire character is brought into cooperating relationship with the magnetic read head or permanent magnetic as the case may be. When a magnetic character passes in flux linking relationship to the single gap magnetic read head, a voltage is induced in the output coil of the magnetic read head, the size of which is proportional to the change in number of lines of flux linking the magnetic read head which in turn is dependent upon the height of the character, the density of magnetic particles in the ink, and the strength of the magnetization field applied to the characters. The output signal is then filtered by a low-pass filter so as to obtain zone signals of the type accompanying the characters depicted in FIGS. 1*a*–1*n* wherein sudden changes in flux which typically occur at the zone boundaries are transformed into either positively going or negatively going signals which traverses an entire zone.

In addition to magnetizing the characters with the aid of a permanent magnet or D.C. write head as described immediately above, it is also possible to magnetize the characters by impressing an alternating current magnetization field upon the characters with a magnetic read head. However, it will be necessary to demodulate the character signals derived from the magnetic reading head because without such demodulation, the signals derived from the character will be alternating signals amplitude modulated by the variations in the character height. Once the signal is demodulated, a character signal similar to that derived from the characters magnetized by a constant magnetization field will be available for filtering.

It is also possible and may be desirable in some instances to utilize optical sensing of the characters, followed by a differentiation of the signals so obtained. If such a method of deriving the character signals is used, the characters need not be written in magnetic ink. It is important only that the optical sensing apparatus be capable of sensing an entire vertical segment of a zone strip. Thus, the character to be read will, in a manner similar to that employed in the magnetic sensing described above, be fed past the optical sensing apparatus in such a fashion that the zone strips of the character will be sequentially sensed.

It will be recognized by one skilled in the art that at any particular instant the amplitude of the signal derived from an optical sensor of the type described, for example, one utilizing as its sensitive element a photoelectric cell, will be inversely proportional to the amount of darkened area within the portion of the zone strip being scanned at that instant. This is in contrast to the situation which prevails when magnetic sensing of magnetized characters is employed: at any particular instant the amplitude of the signal derived from a magnetic read head will be directly proportional to the derivative of the lines of flux linking the read head. Hence, in order to obtain the character signals of the type shown in FIGS. 1*a*–1*n* when employing optical sensing it becomes necessary to differentiate and filter the output signal of the optical sensing apparatus. Of course, any conventional type of signal differentiator may be utilized for this purpose.

From the preceding discussion of the various means possible for deriving character signals, it is to be noted that the only important feature of the character signal derivation apparatus is that it be of the "single gap" type, that is, the apparatus must be capable of sensing an entire vertical segment of a zone strip.

Up to this point, the description has generally centered around the preferred embodiment of the character recognition apparatus, the particular types of characters which can be converted into a useful form by that apparatus, and the relationship of the character signals to the characters from which they are derived as well as the manner in which they can be so derived. What will follow is a brief discussion of the manner in which the character signals are enhanced by the apparatus of the preferred embodiment so as to insure that they will be reliably converted into useful form.

Figure 8:
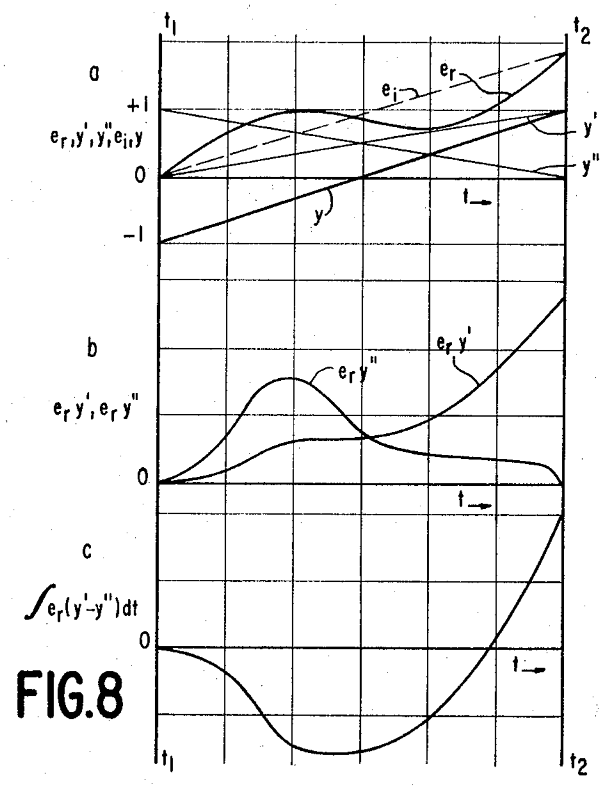
FIG. 8 is a series of waveforms which depict the operation of the zone signal enhancing apparatus.

*Zone signal enhancement.*—Referring to FIG. 8*a*, is seen a plot of a series of five different waveforms to be hereinafter described. The horizontal axis of the composite plot represents time, the point where the horizontal axis intersects the vertical axis being the start of a zone. The vertical axis of the composite plot represents the magnitude of the amplitudes of the respective waveforms, the point where the vertical axis intersects the horizontal axis being designated as a zero amplitude. The dotted waveform $e_i$ represents an "ideal" positive going zone signal. By "ideal" zone signal is meant one that would be obtained if there were absolutely no distortion of any type introduced into the zone signal as a result of imperfections in the character sensing apparatus, printing inaccuracies, circuit parameter variations, etc. However, it must be pointed out that signals that are substantially "ideal" are not practically attainable at this stage of technological achievement and are merely depicted for comparison purposes. The waveform $e_r$ represents a typical "real" zone signal which in practical applications prevails in lieu of the "ideal" zone signal $e_i$. While the instantaneous value of the slope of the zone signal $e_r$ varies, it will be seen that the zone signal $e_r$ has a generally increasing positive value, and hence, is said to have an "underlying slope" which is positive. It is the value of the "underlying slope" which it is desired to determine for the purpose of classifying the zone signals.

It is interesting to note that neither integrating the zone signal $e_r$ nor differentiating the zone signal $e_r$ would reliably provide an indication of the value of its underlying slope. This can be more readily understood by realizing that as to the use of an integrator to classify the zone signals on the basis of whether they have a positive or negative underlying slope the same integral will be obtained regardless of whether the zone signal $e_r$ starts with a zero value and increases to some positive value or starts at some positive value and decreases to a value of zero. In both cases, the $\int e_r dt$, i.e., the area lying beneath the zone signal waveform $e_r$ will be the same, and hence, one will be unable to determine whether the zone signal $e_r$ was increasing or decreasing in value. As to the use of a differentiator as an aid to classifying the zone signals, the constant variation of the instantaneous slope of the zone signal $e_r$ throughout the zone will render the differentiator output useless as an indicator of the underlying slope of the zone signal $e_r$. Hence, it is seen that neither integrating nor differentiating the zone signal will alone enable one to determine the underlying slope of the zone signal.

Therefore, in view of the above noted shortcomings, apparatus has been devised for enhancing the signal $e_r$ so that a subsequent integration of the enhanced zone signal will enable an output signal to be produced which is representative of the underlying slope of the zone signal. The enhancing apparatus comprises a multiplier for multiplying the zone signal $e_r$ by a correlation signal $y$. This correlation signal is a constant slope signal having an initial value of $-1$ and a terminating value of $+1$. The equation for this correlation signal is $$y=\frac{2t}{t_2-t_1}-1$$

If the integral of the enhanced zone signal, $\int e_r y dt$, has a positive value, the underlying slope of the zone signal $e_r$ is positive and a first output pulse representative thereof is produced; if the integral has a negative value, the underlying slope is negative and a second output pulse representative thereof is produced; and if the integral has a zero value, the underlying slope is zero and a third pulse representative thereof is produced.

The manner in which the enhancing apparatus operates can more easily be understood by realizing that the correlation signal $y$ is really the difference between two independent correlation signals $y'$ and $y''$. Hence, the integral of the enhanced signal, $\int e_r y dt$, is simply the difference of the integrals of two independent products, $\int e_r y' dt$ and $\int e_r y'' dt$. Referring to FIG. 8*b*, it is seen that the products obtained by multiplying the zone signal $e_r$ by correlation signal $y''$ are generally smaller than those obtained by the corresponding multiplication of the zone signal $e_r$ by the correlation signal $y'$. The reason for the products of one of the multiplications being larger can be intuitively understood by noticing that in the multiplication involving correlation signal $y''$, the larger values of the correlation signals $y''$ are multiplied by the *smaller* values of the zone signal $e_r$; whereas in the multiplication involving correlation signal $y'$, it is the larger values of the correlation signal $y'$ that are being multiplied by the *larger* values of the zone signal $e_r$. The common factor in each multiplication process, the zone signal $e_r$, has an underlying positive slope and therefore its value increases as you move to the right along the horizontal axis. Since the integral of the enhanced signal, $\int e_r y dt$, is merely the difference of the integrals of the separate products, $\int e_r y' dt - \int e_r y'' dt$, it is seen that the value of the integral of the enhanced zone signal, $\int e_r y dt$, will be positive, negative, or zero, depending upon whether the underlying slope of the zone signal $e_r$ is positive, negative or zero, respectively.

Thus, it has been demonstrated that the use of an easily generated correlation signal $$y=\frac{2t}{t_2-t_1}-1$$

to enhance the zone signal $e_r$ a determination of the underlying slope of the zone signal $e_r$ by the simple expedient of integrating the product of the two signals.

Thus, it has been demonstrated that the provision of a multiplier for obtaining the product of the zone signal $e_r$ and an easily generated correlation signal $$y=\frac{2t}{t_2-t_1}-1$$

facilitates the enhancement of the zone signal $e_r$ which when subsequently fed to an integrator enables the integral thereof to be reliably classified and the value of the underlying slope of the zone signal established.

DETAILED DESCRIPTION OF PREFERRED EMBODIMENT

Figure 3:
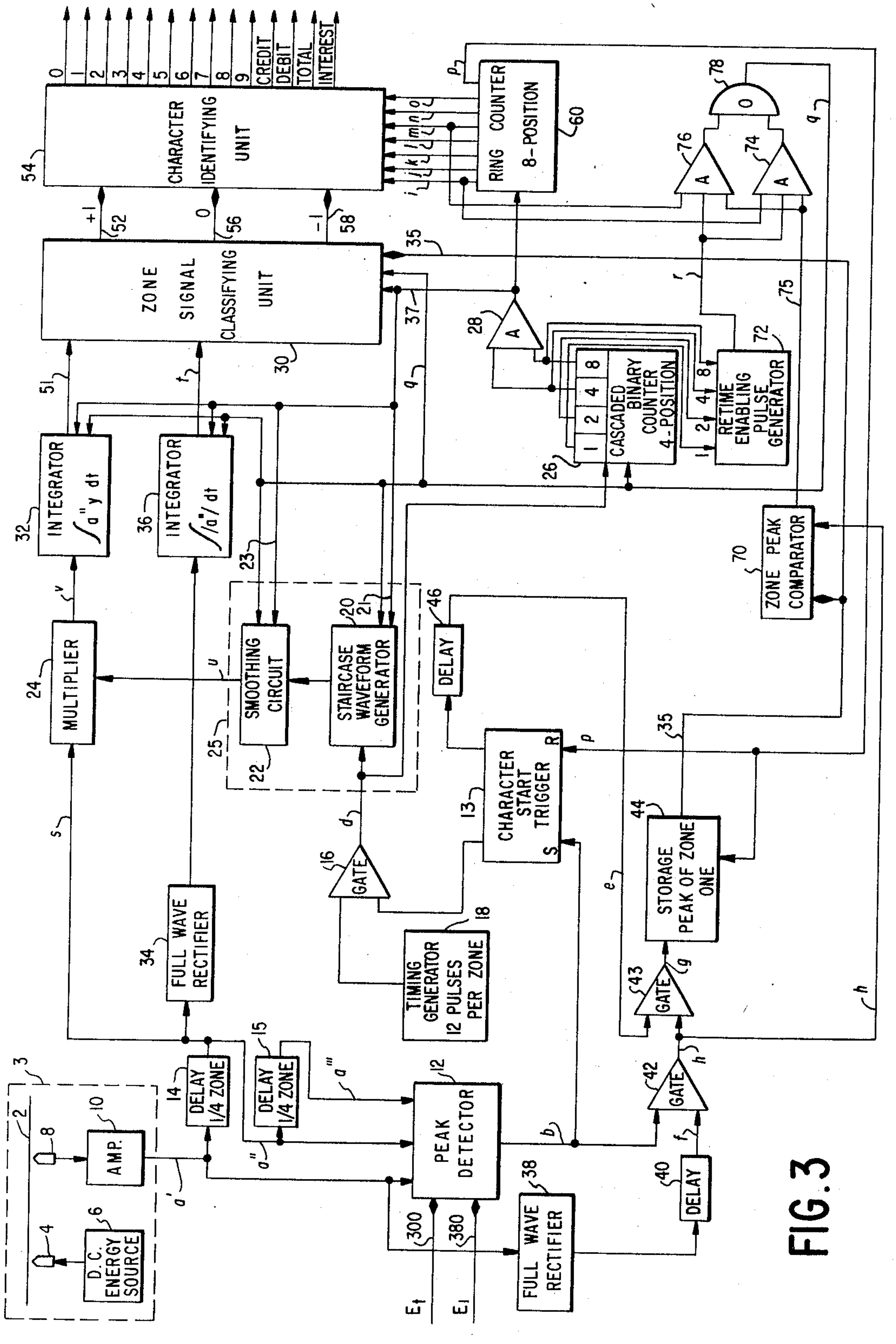
FIG. 3 is a block diagram of the preferred embodiment of the invention.

Now referring to FIG. 3 a block diagram of the preferred embodiment of our invention is depicted. In order that this embodiment may be more easily understood, it will be described assuming that a character is being read. Specifically, the preferred embodiment represented by the block diagram will be described with reference to the processing of the numeral six, the character signal of which is depicted in FIG. 1*g* in its ideal form. Once again, the reader is reminded of two things: First, that the actual character signal for the numeral six does not possess a waveform as depicted in FIG. 1*g*, but rather one that exhibits random and uncontrolled amplitude fluctuations. However, in the description to follow one assumption will be made and that is that there is no character signal distortion of the type attributable to unequal zone widths or document slippage, i.e., the absence of timing errors are assumed. A later discussion will deal with the condition wherein timing errors are present. Second, that the representation of the numeral six in FIG. 1*g* is shown reversed from what a viewer would see if he were looking at the character as printed on a check, inventory card, etc. The reason for such a reversal is merely for matters of convenience. Since the characters are read from right to left, the character signal produced is such that it appears as if the numeral six as shown in FIG. 1*g* were read from left to right. Therefore, in interpreting the character signal for the numeral six assume that the character shown in FIG. 1*g* is being read from left to right.

In FIG. 3 the reader will note the designation of various lines by letters of the alphabet, specifically, by the letters *a* through *w*. These letters correspond to the waveforms shown in FIGS. 2A and 2B and indicate the particular signals present on the respective lines during any portion of the character reading operation. For example, referring again to FIG. 3, the lines emerging from the amplifier 10 and delay lines 14 and 15 are labeled, respectively, *a'*, *a''*, and *a'''* and hence the waveforms corresponding thereto may be found depicted in FIG. 2A–*a*. Likewise, the waveform corresponding to that on line *b* of FIG. 3, the output from the peak detector 12, may be found depicted in FIG. 2A–*b*.

Now referring again to FIG. 3 wherein the preferred embodiment is depicted, an edge view of a document 2 bearing the numeral six (not shown) written in magnetic ink is shown. The numeral six, which appears on the car 2, is reproduced in reverse in FIG. 1*g*. However, it will be understood that this character could be any of the ones depicted in FIGS. 1*a*–1*n* as well as other characters, numerals, letters, or symbols not shown herein but which are written in magnetic ink and designed to yield characteristic signals.

*Character sensing station.*—The document 2, it will be observed, is shown adjacent a character sensing station 3. Suitable conveying apparatus (not shown) is provided for feeding the document 2 past a write head 4, which is supplied with electrical energy by a D.C. energy source 6. The write head 4 serves to magnetize the magnetic particles of the ink in a zone-by-zone fashion as explained hereinbefore. Such a zone-by-zone magnetization, it will be remembered, is due to the particular orientation of the gap of the magnetic head, viz., the gap lies transversly of the direction of document feed and has a length equal to or greater than the height of the character. The document 2 bearing the magnetized numeral six is then fed past a magnetic read head 8 which is adapted to generate the characteristic signal for the numeral six, which is shown depicted in FIG. 1*g*. It will be remembered from the discussion hereinbefore that the magnetic read head 8 possesses a single gap which also lies transversely of the direction of document feed and has a length equal to or greater than the character height. An amplifier 10, having as an input thereto the character signal generated by the magnetic read head 8, is provided to amplify with a minimum of distortion the character signal fed thereto. The source of D.C. energy 6, amplifier 10, and magnetic heads 4 and 8, which comprise the character sensing station 3, are conventional types and will not be described in detail.

Figure 2A:
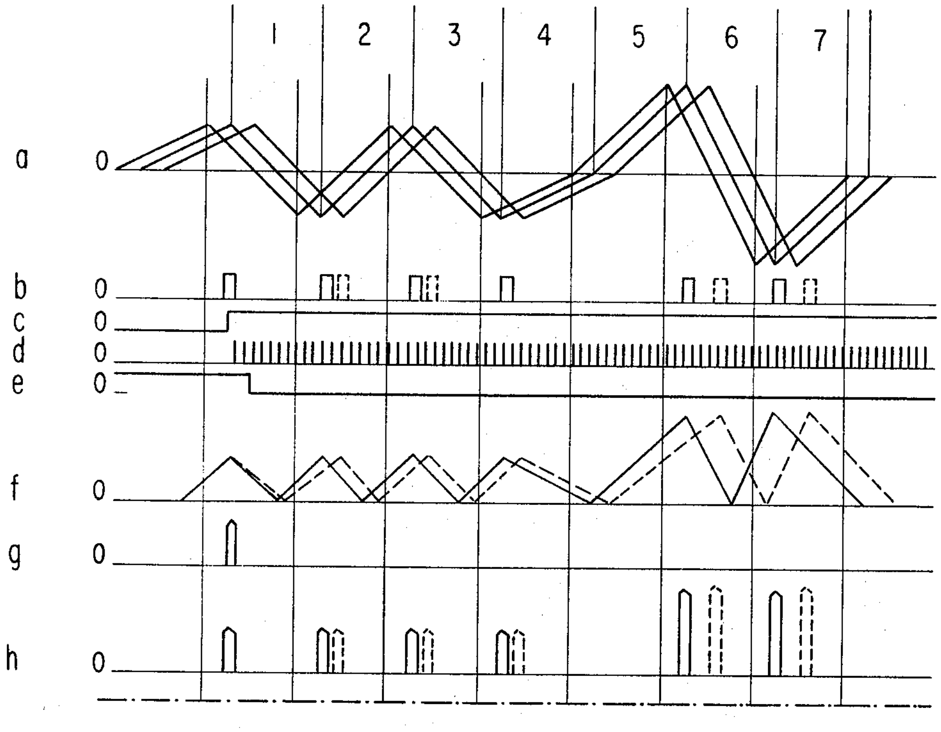
Figure 2B:
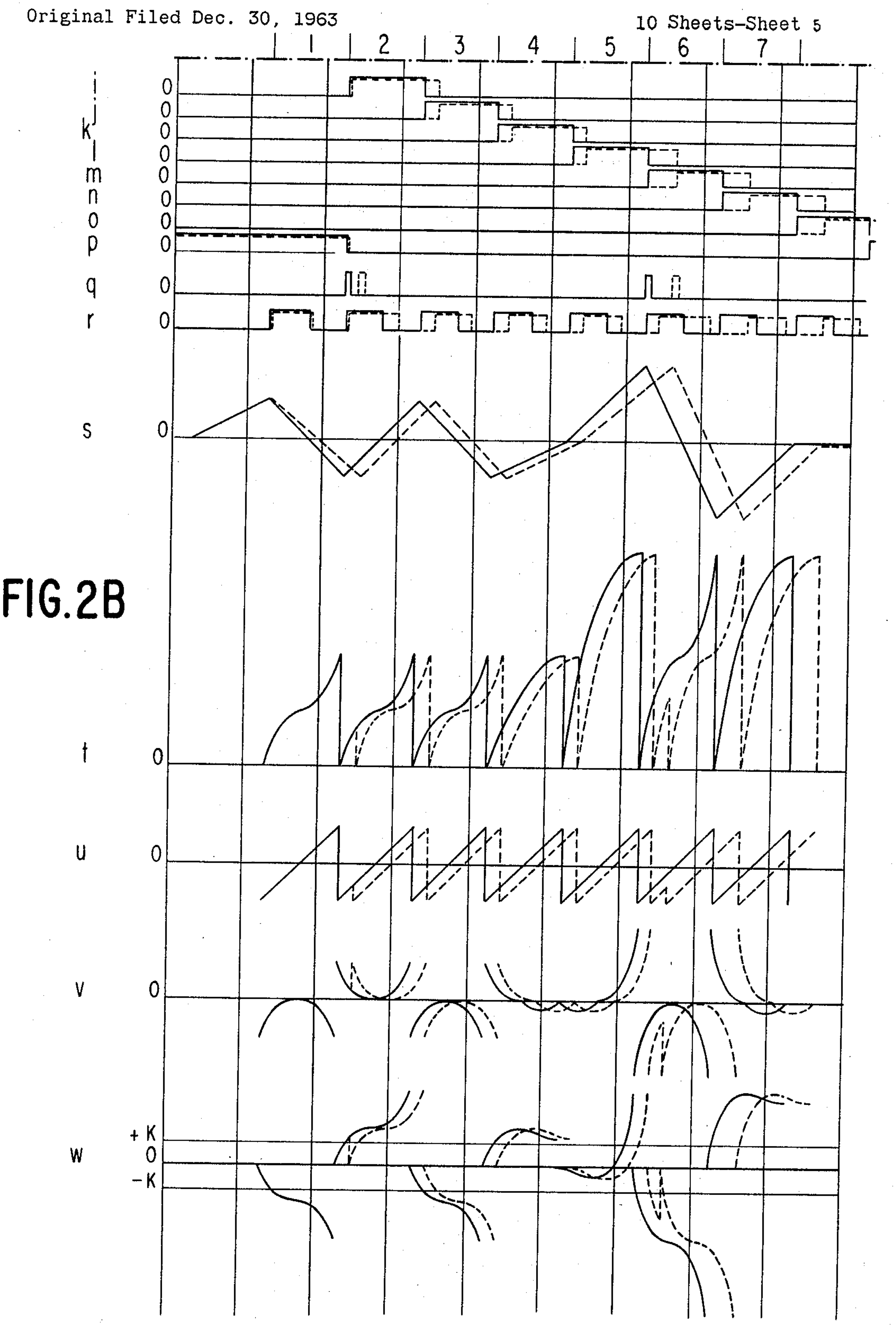

*Peak detector—general.*—So far, what has been described is the apparatus which comprises the character sensing station 3 and which serves to magnetize, read, and amplify the characteristic signal, which is depicted in FIG. 1*g*. Continuing, the amplified character signal shown as an output on line *a'* is fed into a character signal peak detector 12, which will be described in detail hereinafter, and a first delay line 14 which is adapted to delay the input a time equivalent to one-fourth the time it takes to read a zone strip. The once delayed character signal shown as an output on line *a''* is then fed into the peak detector 12, and a second delay line 16 which is adapted to delay the input for a time equivalent to one-fourth the time it takes to read a zone strip. The delay lines 14 and 15 may be of any of the well-known types which can delay the signal while still preserving its shape and may, for example, be constructed in accordance with the teachings of Chapter 10 of Pulse and Digital Circuits, Millman and Taub, McGraw-Hill Publishing Co. (1956). The twice delayed character signal shown as an output on line *a'''* of the second delay line 15 is fed into the peak detector 12. The reader is reminded that the phase relationships of the signals on lines *a'*, *a''*, and *a'''* are depicted in FIG. 2A–*a*. It will be observed that the peak detector 12 has five inputs thereto, viz., a threshold signal $E_t$, a reference level $E_1$, and three different portions of the character signal. Briefly stated, the function of the peak detector 12 is to produce a pulse on line *b* in response to a character signal peak which exceeds a value established by a specified multiple K' of the threshold signal $E_t$. Referring to FIGS. 2A–*a* and 2A–*b*, it will be observed that the peak pulses which appear on line *b*, produced by the peak detector 12, have their leading edges occurring slightly prior to the time when waveform *a''* reaches its negative or positive peaks and their trailing edges occurring slightly thereafter. It will also be observed by referring to FIG. 1*g* that the peaks of the character signal for the numeral six occur at points corresponding to the beginning of the zone strips. Hence, the first character signal peak represents the beginning of the numeral six. The character signal for the numeral six which is shown in FIGS. 1*g* and 2A–*a*, is also reproduced in FIG. 2B–*s* and therein is shown as the solid line waveform. The dotted line waveform is representative of the waveform for the numeral six which has timing errors therein, and which will be the subject of a later discussion. In this regard, it will be remembered that it is assumed for the present that there is an absence of timing errors in the character signal. The amount by which the peak pulse edges on line *b* lead and lag the peaks of the waveform on line *a''* can be controlled to a degree in a manner which will hereinafter be described in detail. Also, to be described in detail hereinafter is the functioning of the threshold signal $E_t$ appearing on line 300. But, for the meantime, it is sufficient to know that the peak detector 12 produces on line *b* a pulse in response to peaks of the character signal which exceed a specified multiple K' of the threshold signal $E_t$.

The peak pulses produced on line *b* are fed to a character start trigger 13 wherein the first peak pulse, which corresponds to the beginning of the first zone, strip sets the trigger. The trigger may be of any of the well-known types of bistable multivibrators having unsymmetrical triggering and may, for example, be constructed in accordance with the teachings of sections 5–1 and 5–7 of Pulse and Digital Circuits cited above. Setting of the trigger 13 enables a gate 16 which then gates timing pulses generated by a timing generator 18. The timing generator may be of any conventional type and may, for example, be made according to the teachings of Chapter 9 of Pulse and Digital Circuits, cited above. The only requirement of the timing generator is that it produce 12 pulses per character zone. Hence, it will become evident that the pulse repetition rate will be dependent on the speed of travel of the document 2 past the magnetic read head 8 because this is what determines the width of a zone signal. The transmission gate 16, like other such gates used in the preferred embodiment, may be any conventional transmission gate and may, for example, be constructed in accordance with the teachings of Chapter 5 of Pulse and Digital Circuits cited above. The timing pulses, which appear on line *d* and which are depicted in FIG. 2A–*d*, are continuously transmitted by gate 16 starting with the first character signal peak, i.e., the start of the first zone of the character, until the trigger 13 is reset by the end of character pulse appearing on line *p* which corresponds to the end of the last zone of the character. The generation of the end of character pulse will be described in detail hereinafter.

Summarizing up to this point what has been described includes:

(a) the character sensing station 3 which reads the document 2 and in response thereto generates the character signal depicted in FIGS. 2A–*a* and 2B–*s* (solid line), and;

(b) the peak detector 12 which, in conjunction with the character start trigger 13, initiates the gating of timing pulses depicted in FIG. 2A–*d*, which have a pulse repetition rate of 12 pulses per zone, from the timing generator 18. The discussion which immediately follows will center upon the correlation signal generator 25 which is employed to successively generate the correlation signals depicted in FIG. 2B–*u*.

*Correlation signal generator.*—The correlation signal generator 25, utilized to successively generate the correlation signals which are depicted in FIG. 2B–*u*, comprises a staircase waveform generator 20 and a smoothing circuit 22. The staircase waveform generator may be any conventional type and, for example, may be constructed in accordance with the teachings of sections 11–11 through 11–13 of Pulse and Digital Circuits, cited above. The only requirement for the staircase waveform generator 20 is that it be capable of providing, in response to an input on line *d* comprising twelve timing pulses, a linearly positively sloping staircase voltage waveform conforming substantially to the equation $$y=\frac{2t}{\Delta t}-1$$

where $\Delta t$ is the zone width. It will be remembered that the timing generator 18 has a pulse repetition rate of 12 pulses per zone. Hence the staircase waveform generator 20 will produce a 12-step staircase voltage waveform in response to the 12 timing pulses fed into it on line *d*. While the general slope of the staircase waveform conforms to the equation $$y=\frac{2t}{\Delta t}-1$$

it has been found desirable to provide a smoothing circuit 22 through which can be passed the staircase waveform generator output to obtain a correlation signal on line *u* having a waveform more nearly approaching that of the equation $$y=\frac{2t}{\Delta t}-1$$

The smoothing circuit may be of any conventional design and, for example, may be a low-pass RC circuit designed in accordance with the teachings of section 2–4 of Pulse and Digital Circuits, cited above. The staircase waveform generator 20 and the smoothing circuit 22 are reset by an end of zone pulse on lines 21 and 23, respectively, following every twelfth timing pulse, i.e., are reset at the beginning of every zone. This insures that the correlation signals will be generated in synchronization with the zone signals depicted in FIG. 2B–*s* which are subsequently to be enhanced.

The combination of a cascaded binary counter 26 and an AND gate 28 are utilized to provide an end of zone pulse. This combination coacting in the following manner produces the end of zone pulse: timing pulses generated by the timing generator 18 and gated through transmission gate 16 are fed to a 4-position cascaded binary counter 26. The cascaded binary counter 26 may be of any well-known type and, for example, may be constructed in accordance with teachings of section 11–1 of Pulse and Digital Circuits, cited above. The outputs of the 4 position and 8 position of the counter 26 are fed to a positive AND gate 28. The positive AND gate is a coincidence gate, i.e., it requires the simultaneous presence of two positive inputs in order to provide a positive output, and may be constructed, for example, in accordance with the teachings of section 13–3 of Pulse and Digital Circuits cited above. The AND gate 28 will only provide an output when both the 4 and 8 positions of the counter 26 are filled, i.e., when the counter receives a total of twelve input pulses thereto. It will be remembered that the pulse repetition rate of the timing generator 18 is twelve pulses per zone. Hence, every twelfth pulse signifies the end of a zone and thus the production of a pulse by AND gate 28, when the counter 26 reaches a count of twelve, signifies the end of that particular zone.

Summarizing the description of the preferred embodiment up to this point, it will be remembered that the character sensing station 3 comprising heads 4 and 8 is provided to generate character signals when a document 2 is drawn therepast, that the peak detector 12 which is responsive to the first peak of the character signal is employed to set the trigger 13 which in turn initiates the gating by gate 16 of the timing pulses at the rate of twelve pulses per zone, and finally, that the staircase waveform generator 20 in combination with the smoothing circuit 22, which is responsive to each sequence of 12 timing pulses, is utilized to generate a correlation signal on line *u* which substantially conforms to the equation $$y=\frac{2t}{\Delta t}-1$$

and is in synchronization with the respective zone signals.

*Enhancing unit.*—What will presently be discussed is the apparatus which is used in conjunction with the correlation signals to enhance the zone signals. It will be remembered from the previous discussion of the zone signal enhancing process that this enhancing operation is achieved by multiplying in seriatim the successively generated zone signals by the successively generated correlation signals. Hence, referring to FIG. 3, it will be observed that a multiplier 24 is provided to perform this zone signal enhancement step. The multiplier may be of any conventional type capable of multiplying two voltages and, for example, may be constructed in accordance with the teachings of section 19–3, Waveforms, Chance et al., McGraw-Hill Book Co., Inc. (1949). Into the multiplier 24 is fed on line *s* the successively generated zone signals and on line *u* the successively generated correlation signals, each of the latter being in synchronization with the former. The enhanced zone signal, which is the product of the zone signal and the correlation signal, emerges on line *v* as the output of the multiplier 24. The reader is reminded that inputs and outputs to the enhancing unit, i.e., the multiplier 24, which appear on lines *s*, *u*, and *v* are depicted in FIGS. 2B–*s*, 2B–*u*, and 2B–*v*, respectively.

*Classifying unit—general.*—Now that the apparatus which is used to enhance the zone signals has been described, the discussion will proceed to a description of the apparatus provided for performing the classifying function. However, a brief review of the classifying function will first be made. It will be remembered from the previous discussion that there is a criterial condition which must be satisfied before an enhanced zone signal will be normalized and classified as either being of the +1 or −1 type, i.e., before the zone signal is deemed to have either an underlying positive or underlying negative slope. The criterial condition which must be satisfied before the enhanced signal will be normalized and so classified is that the integral of the absolute zone signal $\int|a''|dt$, must be larger than a specified multiple, J, of the magnitude of the first peak of the zone signal. It will further be remembered that this criterial condition serves to discriminate between significant zone signals and insignificant zone signals which may be considered to be noise.

This classifying function is accomplished by the zone signal classifying unit 30 which will be described in detail hereinafter. Of the inputs to the classifying unit 30, only four need be described now. The first input to this unit is the integral of the enhanced signal $\int a''ydt$, on line 51. It will be remembered that it is not the enhanced signal on line *v* that is normalized and classified, but the integral of the enhanced signal appearing on line 51. Thus, the first input to the unit 30 which appears on line 51 is obtained by integrating the enhanced signal appearing on line *v* in an integrator 32.

The second input to the zone signal classifying unit 30 is the integral of the absolute zone signal, $\int|a''|dt$, which appears on line *t* and, the reader is reminded, is depicted in FIG. 2B–*t*. This input, like the first input, is obtained by an integrating operation. The zone signal once delayed by delay line 14 is fed into a full wave rectifier 34 of any well-known type to thereby obtain the absolute zone signal. This absolute zone signal is then integrated in integrator 36 and fed on line *t* to the zone signal classifying unit 30. Both of the integrators 32 and 36 are of well-known types and may, for example, be constructed in accordance with the teachings of section 2–5 of Pulse and Digital Circuits, cited above.

The third input to the zone signal classifying unit 30 is the magnitude of the first zone peak which appears as a voltage level on line 35. This voltage level, it will be observed, is generated in the following manner: rectifying the character signal present on line *a'* by passing it through a conventional full wave rectifier 38; passing the rectified signal through a delay line 40 which delays the character signal on line *a'* an amount sufficient to cause the peaks thereof to occur approximately in the middle of the peak pulse generated by the peak detector 12; gating the portion of the delayed character signal appearing on line *f* which coincides with the peak pulse on line *b* through the transmission gate 42; and finally, gating only the first of the character signal peaks appearing on line *h*, so gated by the transmission gate 42, through the transmission gate 43 via line *g* to a conventional storage device 44. It will be noted that the reason why only the first character signal peak is gated to the storage device 44 is that the transmission gate 43 is disenabled, following a brief delay, when the character start trigger 13 switches and the reset output level of the character start trigger, delayed by delay line 46, is transmitted to the one input of the transmission gate 43 on line *e*. And, thus, it is seen how the third input to the zone signal classifying unit 30, which is a reference input signal representative of the magnitude of the first character peak, is generated and applied to the zone signal classifying unit 30 on line 35.

The fourth input to the zone signal classifying unit 30 is an end of zone pulse which is generated by the cascaded binary counter 26 in conjunction with AND gate 28 in the manner described hereinbefore. The function of the end of zone pulse, which, as its name implies, occurs at the end of the zone, is to reset the zone signal classifying unit 30 and prepare it for the classification of the next succeeding zone signal.

Summarizing, the zone signal classifying unit 30 functions to provide a positive output level on line 52 to the character identifying unit 54, which indicates an underlying positive zone signal slope, if:

(a) the integral of the absolute zone signal, $\int|a''|dt$, appearing on line *t* exceeds a specified multiple, J, of the magnitude of the first character signal peak appearing on line 35; and (b) the integral of the enhanced zone signal, $\int a''ydt$, appearing on line 51 is positive and exceeds a specified multiple, K, of the integral of the absolute zone signal, $\int|a''|dt$, appearing on line *t*.

A positive output level on line 58 to the character identifying unit 30, which indicates an underlying negative zone signal slope will be provided if:

(a) the integral of the absolute zone signal, $\int|a''|dt$, appearing on line *t* exceeds a specified multiple, J, of the magnitude of the first character signal peak appearing on line 35; and (b) the integral of the enhanced signal, $\int a''ydt$, appearing on line 51 is negative and exceeds a specified multiple, K, of the integral of the absolute zone signal, $\int|a''|dt$, appearing on line *t*.

A positive output level to the character identifying unit 30 appearing on line 56 which indicates an underlying zone signal slope of zero will be provided if:

(a) the integral of the absolute zone signal, $\int|a''|dt$, appearing on line *t* does not exceed a specified multiple, J, of the magnitude of the first character peak appearing on line 35; and (b) the integral of the enhanced signal, $\int a''ydt$, appearing on line 51 does not exceed a specified multiple, K, of the integral of the absolute zone signal appearing on line *t*.

*Identifying unit.*—The outputs from the zone signal classifying unit 30 are fed to the character identifying unit 54 which comprises two portions:

(a) a zone value storage portion which serves to store the sequence of zone values derived from a particular character; and (b) a combinational logic portion comprising as many logic blocks as there are different characters to read, an output from a particular logic block being indicative of the reading of the character which corresponds to that block.

Figure 6:
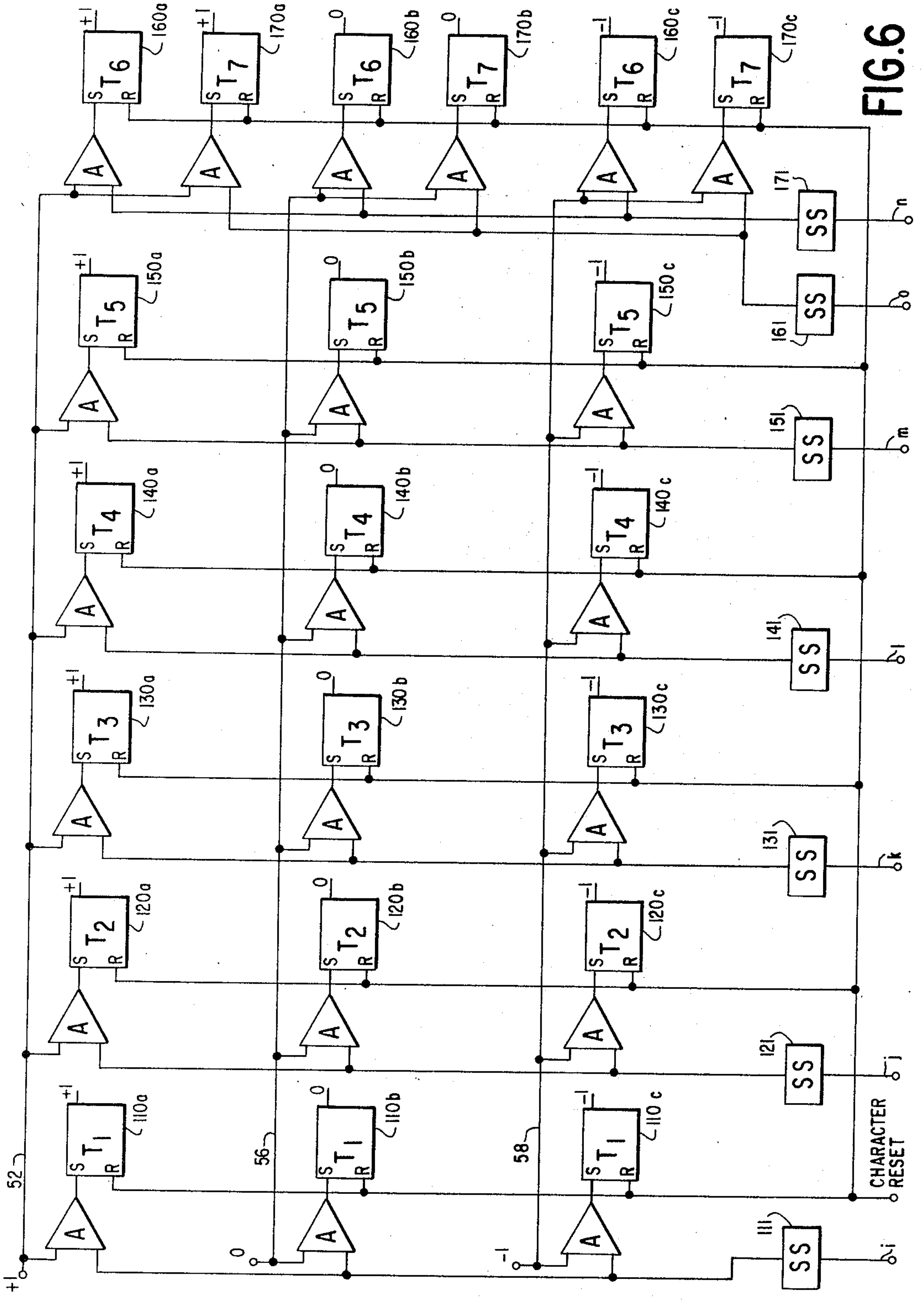
FIG. 6 is a block diagram of a zone value storage unit which comprises a portion of the character identifying unit and which may be used in the preferred embodiment.

Now, referring to FIG. 6, a block diagram depicting the storage portion of the character identifying unit 54 is shown. This storage portion comprises a series of seven groups of bistable multivibrators commonly known as latches, 110, 120, 130, 140, 150, 160, and 170, each group comprising three latches designated within each group by the letters *a*, *b*, *c*. It will be remembered that for the purposes of converting the characters into a useful form, the character signals were said to comprise seven zone signals, each zone signal being classified according to its slope and given a zone value representative thereof. Hence, the presence of seven groups of latches, 110, 120, 130, 140, 150, 160, and 170, each group comprising three latches, *a*, *b*, *c*, is required. Each group of latches, 110, 120, 130, 140, 150, 160 and 170, serves to store the zone value for one zone of the character. For this purpose, each group is provided with three latches, *a*, *b*, *c*, which store respectively, +1, 0, or −1, depending on the zone signal slope for that particular zone. It will be observed by referring to FIG. 6 that each of the seven groups of latches, 110, 120, 130, 140, 150, 160, and 170, has four inputs thereto: three inputs from the zone classification unit 30 on lines 52, 56, and 58, which indicate the presence of a +1 zone value, 0 zone value, and −1 zone value, respectively, and a fourth input from an 8-position ring counter 60. The ring counter is stepped along by successive end of zone pulses generated by AND gate 28. The ring counter is so connected that during the reading of the first zone of the character, the position of the ring counter corresponding to line *p* is in the ON state providing an output on line *p*. The other lines, *i–o*, emanating from the ring counter do not have any output signal thereon. However, upon the termination of each zone starting with the first zone, the end of zone pulse from AND gate 28 successively steps the counter 60 so as to provide outputs successively on lines *i–o*. Such a ring counter 60 may be of any conventional type and, for example, may be constructed in accordance with the teachings of section 11–9 of Pulse and Digital Circuits, cited above. Seven of the eight outputs from the 8-position ring counter 60, viz., the outputs on lines *i*, *j*. *k*, *l*, *m*, *n*, and *o*, are used in conjunction with a plurality of monostable multivibrators, commonly referred to as single-shots, 111, 121, 131, 141, 151, 161, and 171, respectively, to successively gate the zone values which are successively generated by the zone signal classifying unit 30. To facilitate this gating function, an AND gate is provided for each of the latches. The AND gates of any particular group are only enabled during the period when there is an output from the associated single-shots. The single-shots may be of any conventional type and may, for example, be constructed according to the teachings of Chapter 6 of Pulse and Digital Circuits.

Figure 9:
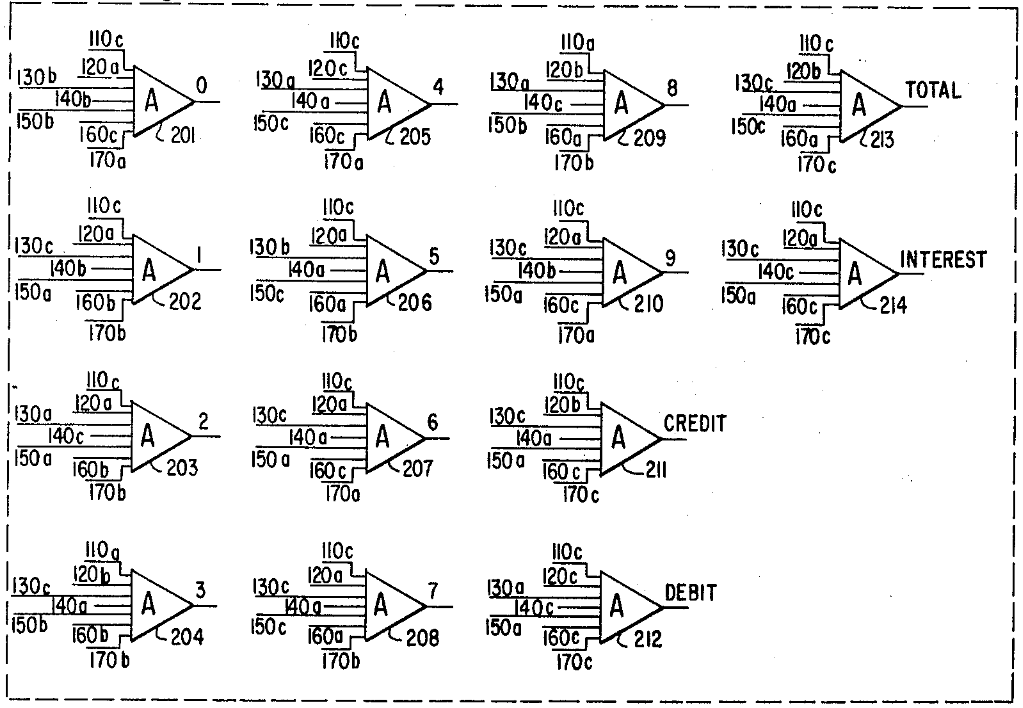
FIG. 9 is a block diagram of a combinational logic unit which comprises a portion of the character identifying unit and which may be used in the preferred embodiment.

Now, referring to FIG. 9, it will be seen that fourteen AND gates 201–214 are depicted and form the combinational logic portion of the character identifying unit 54. There is one AND gate provided for each of the different characters depicted in FIGS. 1*a*–1*n* which it is desired to identify. For example, AND gate 202 corresponds to the character one, AND gate 203 corresponds to character two, etc. Of course, it will be understood by those skilled in the art that the number of AND gates comprising the combinatorial logic portion of the identifying unit 54 will vary depending on the number of different characters it is desired to be able to identify. Each AND gate 201–214 has seven inputs thereto corresponding to the seven zones of a character. The designation on the inputs to each AND gate in FIG. 9 are used to show which of the AND gates receive inputs from a particular one of the latches in FIG. 6. When inputs are present on all seven lines of a particular AND gate, an output pulse is produced by that AND gate. Stated in another way, an output from a particular one of the AND gates 201–214, which indicates that the character corresponding to that AND gate has been read, will be produced only when all the inputs to that AND gate are present. I.e., only when all the latches, the outputs of which are connected to the particular AND gate in question, have been switched by the presence of the unique combination of zone values derived from reading that particular character, will an output be produced by that AND gate indicating that the character associated therewith has been read.

*Retiming unit.*—In the preceding portion of the discussion of the preferred embodiment, certain circuit elements of the circuit of FIG. 3, namely, the zone peak comparator 70, the retime enabling pulse generator 72, the AND gates 74 and 76, and the OR gate 78, were not included in the description nor their functions or outputs explained. These circuit elements, which mitigate the effects due to timing errors in the character signals, were not necessary to the preceding consideration of the preferred embodiment inasmuch as distortionless character signals having no timing errors were assumed. In fact, these circuit elements can be eliminated from the circuit of FIG. 3 because they perform no function essential to the proper conversion of distortionless characters into a useful form. However, in the portion of discussion of the preferred embodiment which follows wherein distortionless character signals are not assumed, the function of these circuit elements become important, and consequently, this portion of the description of the preferred embodiment, which in reality is an elaboration of the preceding one, will center upon the interrelation of these circuit elements with the elements of the circuit heretofore described. Digressing for a moment to the preceding portion of the description of the preferred embodiment wherein it was assumed that a distortionless character signal had been generated by the character sensing station 3, it will be remembered that correlation signals were generated by the staircase waveform generator 20 and smoothing circuit 22 and fed on line *u* to the multiplier 24 in synchronization with the feeding of zone signals on line *s* to the multiplier. Such a synchronization was possible because the correlation signals were generated in response to the gating of 12 timing pulses to the staircase waveform generator 20, the duration of time required for the gating of 12 timing pulses being equivalent to the duration of time necessary to generate a single zone signal. Since an imperfect character introduces timing errors into the character signal, it becomes evident that such a state of synchronization between successive zone signals and the successively generated correlation signals would not be possible. This unwelcome result occurs because the correlation signals are being generated independently of the particular zone signal to which they are associated. In the specific example under consideration, viz., the distorted character signal for the numeral six which is depicted by the dotted line waveform in FIG. 2B–*s*, wherein timing errors are present in zones one and five, the duration of the zone signal for these particular zones is in fact longer than the associated correlation signal and thus it becomes immediately clear that synchronization therebetween is no longer possible. To mitigate the effects due to this lack of synchronization between the correlation and associated zone signals resulting from the timing errors introduced in zones 1 and 5, circuitry, including elements 70, 72, 74, 76, and 78, has been provided in the preferred embodiment. Broadly stated, the function of these circuit elements is to reinitiate the generation of the correlation signal for a particular zone when the zone signal for the preceding zone is longer than it ideally should be. Such a reinitiation of the correlation signal re-establishes the state of synchronization between the zone signal for that particular zone and its correlation signal. Specifically, with reference to FIG. 2B–*s*, it will be seen that the start of the second zone signal has been delayed due to the distortion in the zone signal of zone 1. If the generation of the second correlation signal were not reinitiated, the beginning portion of the second correlation signal would be multiplied by the end portion of the first zone signal when in fact the second correlation signal should be multiplied only by the second zone signal. This same mismatch would obtain for the remaining zone signals, that is, the beginning portion of each correlation signal would be multiplied by the end portion of the preceding zone signal, if the retiming circuitry comprising elements 70, 72, 74, 76, and 78 were not included. The errors inherent in multiplying mismatched zone and correlation signals are obvious, and therefore, provision has been made in the preferred embodiment to re-establish the state of synchronization between the correlation signals and associated zone signals thereby minimizing the resultant errors.

Referring to FIG. 3, it is seen that the staircase waveform generator 20 and the smoothing circuit 22 which comprise the correlation signal generator each have three inputs thereto, two of these inputs serving ot reset the respective circuit elements. As was discussed previously, one of the reset inputs to the staircase waveform generator 20 and the smoothing circuit 22 is an end of zone signal generated by AND gate 28. This end of zone signal, it will be seen, also is fed to the integrators 32 and 36 and to the zone signal classifying unit 30. This end of zone signal generated by AND gate 28 serves to reset each of circuits elements 20, 22, 32, 36, and 38 at the end of each zone so that the correlation signal generating, zone signal enhancing, and zone signal classifying functions may be reinitiated at the beginning of each new zone. The other input to the staircase waveform generator 20 and the smoothing circuit 22 is a retiming pulse, which appears on line *q*, the function of which will become evident hereinafter, and which is generated by OR gate 78. This retiming pulse, it will be noted, is also fed to integrators 32 and 36, zone signal classifying unit 30, and the cascaded binary counter 26. Upon receipt of such a retiming pulse from OR gate 78 the respective circuit elements are reset as they are upon the receipt of an end of zone pulse from AND gate 28.

The purpose of the zone peak comparator 70 in this retiming apparatus is to insure that retime pulses on line *q* which are generated only in response to certain character signal peaks, are not generated in response to insignificant or spurious peaks which may be present in the character signal. Specifically, retime pulses are generated only in response to delayed character signal peaks which exceed at least the minimum value, namely, the value of the first zone peak. Thus, the first zone peak serves as a standard for determining the presence of significant, later occurring character signal peaks. This zone peak comparator 70 may be of any conventional type of voltage comparator, and, for example, may be constructed according to the teachings of chapter 15 of Pulse and Digital Circuits, cited above.

Figure 7:
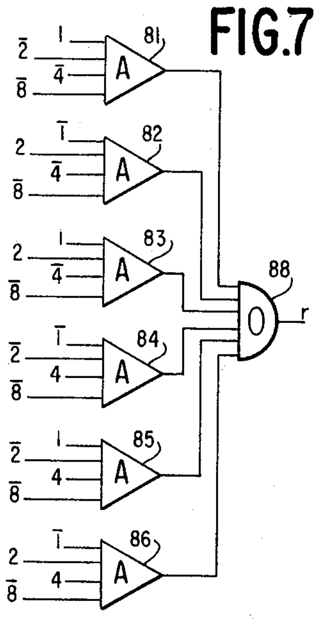
FIG. 7 is a block diagram of a retime enabling pulse generator which may be used in the preferred embodiment.

The retime enabling pulse generator 72 is provided to limit the conditions under which retime pulses are generated by OR gate 78. Referring to FIG. 7, one possible circuit arrangement for the retime enabling pulse generator is depicted in block diagram form. This consists merely of 6 AND gates 81–86 having their outputs fed to a common OR gate 88. The inputs to the AND gates 81–86 comprise different combinations of outputs of the cascaded binary counter 26, the inputs to the respective AND gates being designated in the sketch of FIG. 7. Looking at these inputs to the AND gates 81–86, it will be seen that an output is produced by AND gate 81, and hence, OR gate 88 when the binary counter 26 contains a count of 1, an output from AND gate 82, and hence, OR gate 88 when the binary counter 26 contains a count of 2, and output from AND gate 83, and hence, OR gate 88 when the binary counter 26 has a count of 3, etc. Thus, an output is produced on liner by OR gate 88 during the first half of each zone, because it is during the first half of each zone that the cascaded binary counter 26 contains counts of 1, 2, 3, 4, 5, and 6.

*Classifying unit—detailed.*—The zone signal classifying unit 30, the functioning of which was heretofore described only in general terms will now be discussed in detail. The reader will remember that the function of the zone signal classifying unit 30 was to produce zone values based on the magnitudes of the inputs thereto and their relationships to each other. Specifically, a zone value of +1 would be produced on line 52 if the integral of the enhnaced zone signal, $\int a''ydt$, exceeded a specified multiple, K, of the integral of the absolute zone signal, $\int /a''/dt$, and the integral of the absolute zone signal, $\int /a''/dt$, exceeded a specified multiple, J, of the first character signal peak; a zone value of −1 would be produced on line 58 if the integral of the enhanced zone signal, $\int a''ydt$, was negative and exceeded a specified multiple, K, of the integral of the absolute zone signal, $\int /a''/dt$, and if the integral of the absolute zone signal, $\int a''/dt$, exceeded a specified multiple, J, of the first character signal peak; and a zone value of zero would be produced on line 56 if the integral of the enhanced zone signal, $\int a''ydt$, whether positive or negative, was less than a specified multiple, K, of the integral of the absolute zone signal, $\int /a''/dt$. The foregoing conditions, which are necessary to the production of zone values are stated in terms of certain mathematical inequalities. However, it will be understood by those skilled in the art that the stated inequality conditions can be treated mathematically as the equivalent of certain division operations. For example, one of the conditions stated for producing a zone value of +1 on line 52 is that $\int a''ydt - K\int /a''/dt > 0$. This condition may also be satisfied if the quotient produced by dividing the integral of the enhanced zone signal, $\int a''ydt$, by the integral of the absolute zone signal, $\int /a''/dt$, exceeds a specified multiple, K. I.e., the condition will be satisfied if $$\frac{\int a''ydt}{\int /a/dt} > K$$

While in the following description of the classifying unit circuitry has been utilized which performs subtraction operations, it will be understood that satisfaction of the stated inequality conditions could be ascertained utilizing dividers. In other words, it is to be understood that in the example stated above the following two inequalities are equivalent although the first would utilize a subtractor and the latter a divider to ascertain whether the condition has been satisfied:

$$\int a''ydt - K\int /a''/dt > 0$$

and $$\frac{\int a''ydt}{\int /a/dt} > K$$

Likewise, throughout the discussion criterial conditions, the satisfaction of which are necessary to obtaining zone values, have been referred to in terms of both divisions and subtractions where felt appropriate to a clearer understanding of the invention.

Figure 5:
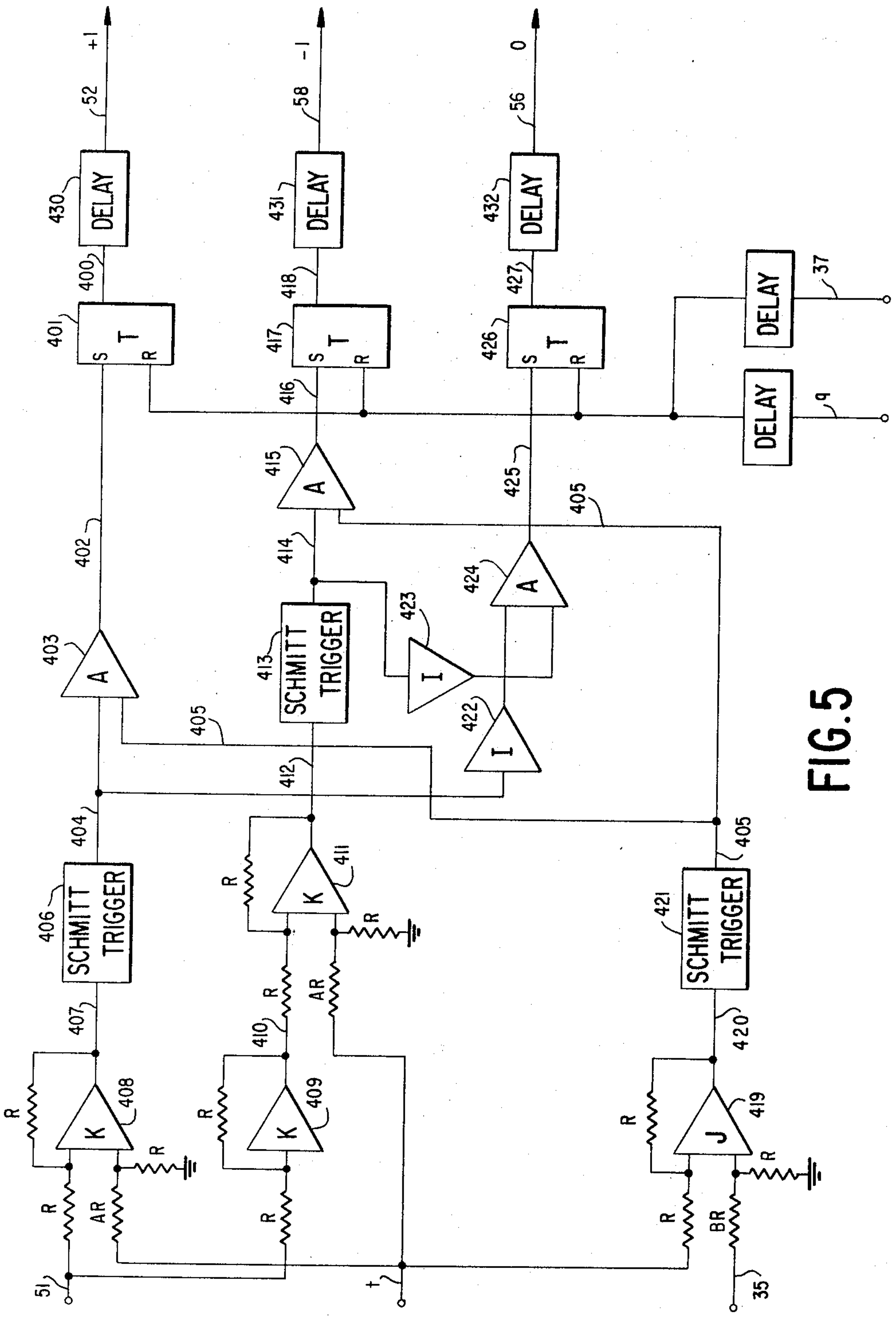
FIG. 5 is a block diagram of a zone signal classifying unit which may be used in the preferred embodiment.

One possible circuit for performing the operations of the classifying unit is depicted in FIG. 5. Of course, it will be understood by those skilled in the art that this circuit is one of many possible circuits. The circuit, it will be observed, has five inputs thereto:

(a) the integral of the enhanced zone signal appearing on line 51;

(b) the integral of the absolute zone value appearing on line 51;

(c) the magnitude of the first character signal peak appearing on line 35;

(d) the end of zone pulse generated by AND gate 28 appearing on line 37; and (e) the retime pulse generated by OR gate 78 appearing on line *q*.

The end of zone pulse appearing on line 37, it will be remembered, serves to gate the zone values to the character identifying unit 54 at the end of each zone. The retime pulse appearing on line $q$, it will be recalled from the discussion of the operation of the preferred embodiment wherein character signals having timing errors were assumed, serves to reset the zone signal classifying unit 54. With the functions of these two signals in mind, viz, the end of zone pulse and the retime pulse, a description of the operation of the circuit of FIG. 5 will now be undertaken.

An output will appear on line 400, and hence, on line 52 representing a +1 zone value if trigger 401 was switched by a signal produced by AND gate 403 which appears on line 402. It will be observed that AND gate 403 in order to produce a pulse on line 402 requires the coincidence of 2 inputs, namely, a signal on line 404 and a signal on line 405. The first of these pulses required for the generation of an output by AND gate 403 will be present only if the integral of the enhanced zone signal appearing on line 51 exceeds the integral of the absolute zone signal appearing on line $t$, that is, only if an output is produced by operational amplifier 408 thereby causing an output from Schmitt trigger 406 which appears on line 404. The operational amplifiers which are of any conventional type, and may, for example, be constructed according to the teachings of sections 1–11 through 1–13 of Pulse and Digital Circuits, cited above, are herein used to perform either a subtraction or multiplication operation. Such a use of operational amplifiers to perform mathematical operations is based on well-known principles, and hence, need not be discussed in detail herein. Operational amplifier 408, it will be observed, performs a subtraction operation. Specifically, it subtracts from the integral of the enhanced zone signal appearing on line 51, a specified multiple of the integral of the absolute zone value. The specified multiple in this instance being the constant K herein discussed. Such a subtraction will be performed according to basic operational amplifier theory if the impedance of line $t$, which appears as a resistance designated AR, has a value AR where $$A=\frac{2}{K}-1$$

The other input necessary to the generation of an output by AND gate 403 which appears on line 402 is the presence of an input thereto on line 405. Such an input on line 405 will be present only when Schmitt trigger 421 has an input thereto on line 420. Inasmuch as operational amplifier 419 serves to subtract a specified multiple of the first character signal peak appearing on line 35 from the value of the integral of the absolute zone value appearing on line $t$, an input on line 420 to Schmitt trigger 421 will exist only when the integral of the absolute zone value appearing on line $t$ exceeds a specified multiple of the first character signal peak, said multiple being in this case a constant J herein described. The specified multiple J is introduced into the mathematical operation of operational amplifier 419 if the value of the input impedance on line 35, which appears as a resistance designated BR, has a value equal to BR where $$B=\frac{2}{J}-1$$

An output on line 418, and hence, on line 58 indicative of a −1 zone value will be present only if trigger 417 was switched by a signal generated by AND gate 415 which appears on line 416. Such a signal generated by AND gate 415 and which appears on line 416 will be present only if the two inputs thereto on lines 414 and 405 are present. The conditions for the presence of a signal on line 405 have already been discussed with respect to AND gate 403 and will not be again discussed. However, with respect to line 414 it will be observed that an output signal will be present thereon when an input to Schmitt trigger 413 appearing on line 412 is present.

Because of the functioning of operational amplifier 409 as a sign changer and operational amplifier 411 as a subtracter, an input to Schmitt trigger 413 which appears on line 412 will only be present when the integral of the enhanced zone value is negative and exceeds a specified multiple of the integral of the absolute zone value. The specified multiple in this case is the constant K.

An output on line 427, and hence, on line 56 corresponding to a zero zone value will be present if trigger 426 was switched by an output from AND gate 424 which appears on line 425. Such an output on line 425, it will be observed, will only occur when the absolute value of the integral of the enhanced zone signal is less than a specified multiple, K, of the integral of the absolute zone value. Stated in another way, an output on line 425 which is generated by AND gate 424 will only be present when outputs from Schmitt triggers 406 and 413 are not present. The conditions for the absence of outputs from Schmitt triggers 406 and 413 have already been discussed and, therefore, will not be considered further.

Since the end of zone pulse appearing on line 37 which resets triggers 401, 417, and 426 is the same pulse that steps ring counter 60 it was found necessary to include delay lines 430, 431, 432 in the circuit of FIG. 5. This is to insure that the outputs from triggers 401, 417, and 426 will not be lost by resetting the triggers before the gating pulses which appear on lines $i$, $j$, $k$, $l$, $m$, $n$, and $o$ perform the function of gating the zone values which appear on lines 52, 56, and 58 to the respective latches in the circuit of FIG. 6.

The Schmitt triggers used herein may be constructed in accordance with the principles of section 5–10 of Pulse and Digital Circuits.

*Peak detector—detailed.*—The peak detector 12, the functioning of which was heretofore described only in general terms will now be discussed in detail with reference to FIG. 4. It will be remembered that the function of the peak detector 12 was to produce a peak pulse on line $b$ in response to character signal peaks exceeding a specified threshold value $E_t$. The peak detector 12, it will be observed, has five inputs thereto:

(a) The character signal on line $a'$;
(b) The character signal once delayed on line $a''$;
(c) The character signal twice delayed on line $a'''$;
(d) Threshold signal $E_t$ on line 300; and
(e) The reference level $E_l$ on line 380.

Figure 4:
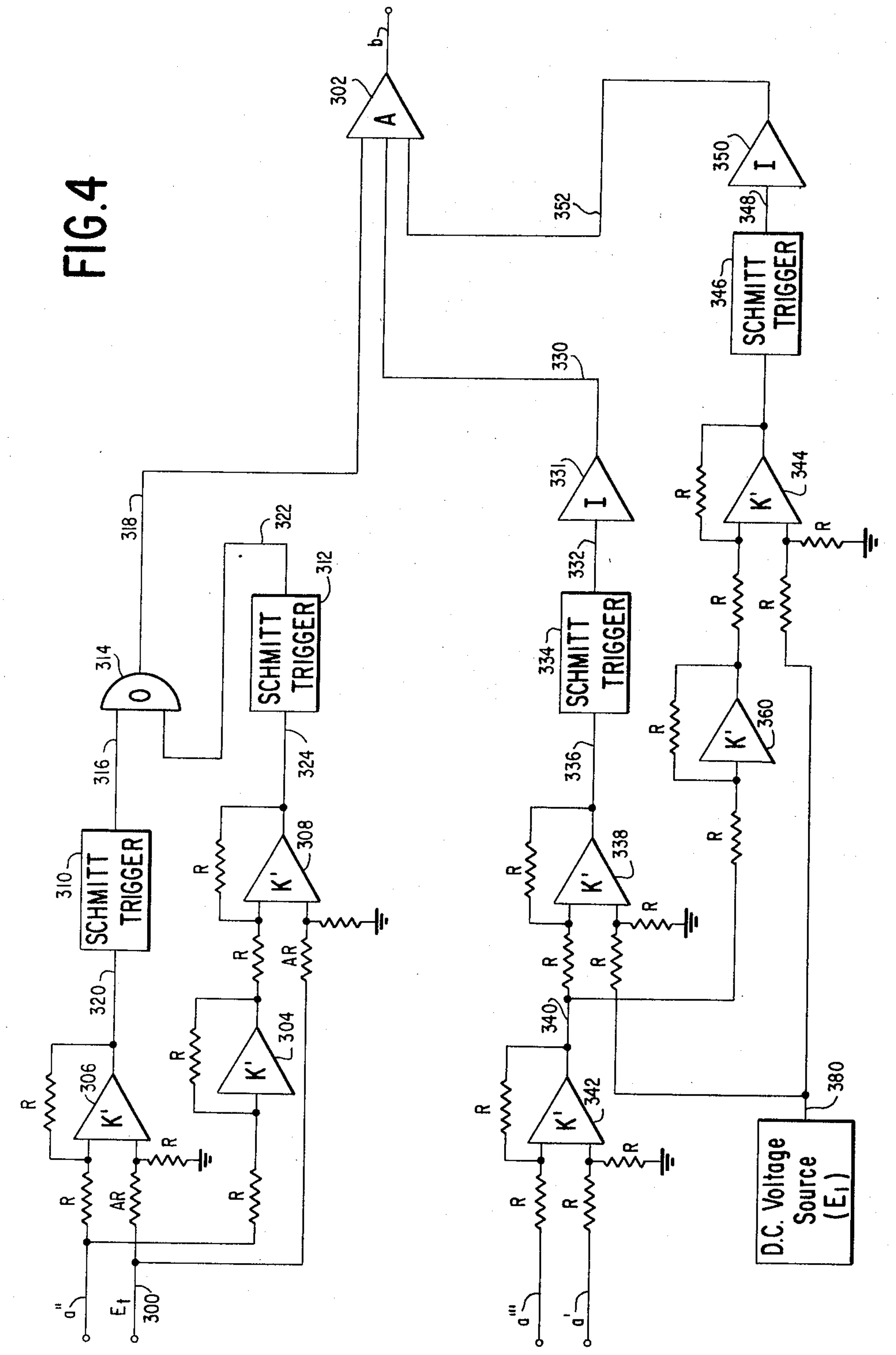
FIG. 4 is a block diagram of a peak detector which may be used in the preferred embodiment.

Now, referring to the peak detector circuit depicted in FIG. 4, it will be observed that a peak pulse on line $b$ is generated by AND gate 302 when three conditions are satisfied. The first condition that must be satisfied is that the absolute value of the signal on the $a''$ be greater than $K'E_t$. This condition may exist when $a''$ is either negative or positive. To take care of these latter two possibilities, three operational amplifiers 304, 306, and 308, are used in conjunction with a pair of Schmitt triggers 310 and 312 and an OR gate 314. Generally, an output is produced on line 318 whenever the signal on line $a''$ is positive and exceeds $K'E_t$. Specifically, an output is produced on line 316, and hence, on line 318 whenever the signal appearing on line 320 is positive, the signal on line 320 being positive only when the signal on line $a''$ is positive and exceeds $K'E_t$. The reason the signal on line 320 is positive only when the signal on line $a''$ is positive and exceeds $K'E_t$ is because operational amplifier 306 performs a subtraction operation: it subtracts a specified multiple K′ of the input on line 300 from the input on line $a''$. The specified multiple K′ is introduced into the mathematical operation of the operational amplifier 306 if the value of the input impedance on a line 300, which appears as a resistance designated AR, has a value equal to AR where $$A=\frac{2}{K'}-1$$

The signal on line 318 is also positive, as was noted above, when the signal on line 322 is positive, the signal on line 322 being positive only when the signal on line 324 is positive. Since operational amplifier 308 performs a subtraction function, the signal on line 324 will be positive only when the signal on line *a''* is negative and exceeds $K'E_t$. It will be noted that operational amplifier 304 serves merely to change the sign of the input thereto on line *a''*. Summarizing, the signal on line 318 will be positive thereby satisfying one of the three necessary conditions for obtaining a pulse on line *b* whenever the absolute value of the signal on line *a''* exceeds $K'E_t$.

The second condition the satisfaction which is necessary to obtain a peak pulse on line *b* is that the output of the inverter 331 which appears on line 330 be positive, this output on line 330 being positive only when there is no output on line 332 from Schmitt trigger 334. Proceeding further it is seen that there is no output on line 332 from the Schmitt trigger 334 whenever there is no positive input to the Schmitt trigger on line 336, there being no such input to Schmitt trigger 334 on line 336 whenever the subtraction operation performed by operational amplifier 338 yields a value below zero. Such a value below zero is present on line 336 when the signal on line *a'''* does not exceed that on line *a'* by an amount in excess of the reference value established by reference level $E_1$. Stated in another way, an output is produced on line 330 only when the input on line *a'''* exceeds the input on line *a'* by an amount greater than the reference level $E_1$ appearing on line 380 as an input to the operational amplifier 338. It will be noted that both operational amplifiers 342 and 338 function as subtractors.

The third condition which must be satisfied if a peak pulse is to be produced on line *b* is that the signal on line 352 be positive, the signal on line 352 being positive only when there is no output from Schmitt trigger 346 which appears on line 348. Proceeding, it is seen that there will be no output from Schmitt trigger 346 when the output from operational amplifier 344 is below zero, said output being below zero only when the input on line *a'* does not exceed that on line *a'''* by an amount in excess of the reference $E_1$. It will be noted operational amplifier 360 merely acts to change the sign of the input to operational amplifier 344, the latter of which functions as a subtractor.

The peak detector of FIG. 4 serves, therefore, to produce peak pulses on line *b* whenever the following two relationships between the five input signals are satisfied:

(a) The absolute value of the signal on line *a''* is greater than $K'E_t$ and (b) The absolute value of the difference between the signal on line *a'''* and that on line *a'* is less than reference level $E_1$ appearing as an input on line 380.

The provision of a threshold signal input $E_t$ appearing on line 300 to the peak detector enables one to disregard all character signal peaks, and hence, characters, the character signals of which do not exceed a multiple K' of a specified value, namely, the value of the threshold signal $E_t$. In this way character signals which are too faint, i.e., those having peaks which do not exceed a multiple K of the threshold signal $E_t$ and, therefore, cannot be read with reliability, may be disregarded and read by a human operator. It has been found better in practice to read faint characters utilizing a human operator rather than attempt to read them automatically and run the risk of an erroneous character identification.

The provision of the reference level $E_1$ in the peak detector enables regulation of the time of occurrence of the peak pulse with respect to the presence of the character signal peak on line *a''*. Referring again to FIG. 4 it will be seen that a character peak pulse on line *b* will only be present if, among other things, the absolute value of the difference between the signals on lines *a'* and *a'''* is less than the reference level $E_1$. Assume for a moment that the value of reference level $E_1$ is arbitrarily set at a value of approximately zero. Looking at FIG. 2A–*a*, it will be seen that the point at which the inputs on line *a'* and *a'''* are approximately equal to each other, that is, the point at which the difference between their values is approximately equal to zero, corresponds to the point at which the peak of the character signal appears on line *a'''*. Thus, if it is desired that the leading edge of the peak pulse on line *d* occur at a time which corresponds to the peak of the waveform on line *a''* then the value of reference level $E_1$ should be adjusted so as to be approximately equal to zero. As the value of the reference level $E_1$ increases from zero it will be seen that the leading edge of the peak pulse on line *b* will precede the occurrence of the peak of the character signal on line *a''* and the lagging edge will occur a corresponding time after the peak of the character signal on line *a''*. However, it should be noted that the position of the leading and lagging edges of the peak pulses on line *b* may not be advanced and delayed, respectively, with respect to the peak of the character signal on line *a''* without limit. The reason for the existence of a limitation becomes clear if the reader remembers that the occurrence of a peak pulse depends also on the absolute value of the character signal peak exceeding $K'E_t$. It would be possible, if this limitation of the absolute value of the character signal peak exceeding $K'E_t$ were not imposed for the value of the reference level $E_1$ to be made so large that a pulse could be produced on line *b* when the absolute value of the character signal peak did not exceed $K'E_t$. Such a production of pulses on line *b* when the absolute value of the character signal peak does not exceed $K'E_t$ leads to unreliable results as was noted above and therefore is to be avoided.

The threshold value $E_t$ will usually be so adjusted that the condition that the absolute value of the character signal peak exceed $K'E_t$ will be satisfied at points other than the point of the peak of the character signal on line *a''*, yet will not be so large that peak pulses are produced when the absolute value of the character signal peak does not exceed $K'E_t$. Thus, it is seen that the leading edge of the peak pulse on line *b* may be made to occur at a point which precedes the occurrence of the character signal peak on line *a''*, but that this regulation of the time of occurrence of the leading edge of the peak pulse is not subject to regulation without limit.

OPERATION

The description of the operation of the preferred embodiment depicted in FIG. 3 will be undertaken in two parts. In the first part, it will be assumed that a document bearing the numeral six, the character signal of which contains no timing errors, i.e., the character signal of which is without distortion of the type caused by inaccurately dimensioned characters or document slippage, is being read. The solid line waveforms of FIGS. 2A and 2B represent the signals present in the preferred embodiment during the reading of the numeral six, the numeral six being without signal distortions of the type described. In the second part, it will not be assumed that errors of the type above-described are not present, but on the contrary it will be assumed that such errors are present.

Now referring to FIG. 3, it will be seen that a document 2 having the numeral six written in magnetic ink is fed past a magnetic write head 4 and a magnetic read head 8 where the numeral is magnetized and read, respectively. The first peak of the character signal is detected by peak detector 12 and a peak pulse on line *b* is generated and fed to a character start trigger 13. The character start trigger 13 is set by the peak pulse on line *b* and initiates the gating of timing pulses from the timing generator 18 at the rate of 12 pulses per zone to the correlation signal generator 25 comprising the staircase waveform generator 20 and the smoothing circuit 22. In response to every 12 timing pulses, the staircase waveform generator 20 generates a staircase voltage waveform corresponding roughly to the equation $$y=\frac{\Delta t}{2t}-1$$

said voltage waveform being subsequently smoothed by a smoothing circuit 22. Thus, a correlation signal having a waveform represented by the equation $$y=\frac{2t}{\Delta t}-1$$

is generated once per zone in synchronization with the zone signals.

The output line from transmission gate 16 is also fed to the cascaded binary counter 26 where it is used to step the counter and in conjunction with AND gate 28 derive an end of zone pulse. The end of zone pulse serves to reset various components of the circuit at the termination of each zone, including the correlation signal generating means 20 and 22.

In synchronization with the feeding of correlation signals on line *u* to the multiplier 24, zone signals generated by the character reading apparatus are also fed on line *s* to the multiplier 24 where enhanced zone signals comprising the product of the zone signals on line *s* and the correlation signals on line *u* are produced. The enhanced zone signals which appear on line *v* are integrated by integrator 32 and fed to the zone signal classifying unit 30 where the integral of the enhanced signal is normalized and classified. The normalizing operation, it will be remembered, involves what in effect is the mathematical equivalent of dividing the integral of the enhanced signal, $\int a''ydt$, by the integral of the absolute zone signal, $\int |a''|dt$, the latter of which is generated by full wave rectifier 34 in conjunction with integrator 36. The sequence of output signals from the zone signal classifying unit 30 herein referred to as the "zone values," which indicate the classification given each zone signal according to the slope, are gated at the end of each zone by the end of zone pulse to the character identifying unit 54, where the sequence of zone values serves to produce a signal representative of the character read.

To become more specific, the operation of the classifying unit 30, which classifies the zone signals of the numeral six, will be described with reference to FIG. 2B–*w*. It will be remembered that it is not the value of the enhanced zone signal, $a''y$, appearing on line *v*, nor the integral of the enhanced signal, $\int a''ydt$, appearing on line 51 that is being classified, but rather the integral of the enhanced signal after it has been normalized. Normalization, it will be remembered, is achieved by dividing the integral of the enhanced signal, $\int a''ydt$, appearing on line 51 by the integral of the absolute zone signal, $\int |a''|dt$, appearing on line *t*. Thus, in classifying the zone signals, it is the value of this quotient, i.e., the normalized value of the integral of the enhanced zone signal, that must be positive or negative and in excess of a predetermined constant, K, if the zone signal is to be deemed to have an underlying positive or negative slope, respectively. Hence, in FIG. 2B–*w* what is depicted is the normalized value of the integral of the enhanced zone signal $$\frac{\int a''ydt}{\int |a|dt}$$

If this value, i.e., the normalized value of the enhanced zone integral, exceeds +K then the underlying slope of the zone signal for that zone is deemed to be positive. If the normalized value exceeds —K, i.e., is more negative than —K, then the underlying slope of the zone signal for that zone is deemed to be negative. And, if the normalized value is between +K and —K, then the underlying slope of the zone signal for that zone is deemed to be zero. Thus, a check of the values of the normalized integral of the enhanced zone signals $$\frac{\int a''ydt}{\int |a''|dt}$$

for each zone, which are depicted in FIG. 2B–*w*, will indicate that the expected sequence of outputs from the zone signal classifying unit 30 for the character six are as follows:

First Zone: A signal on line 58 indicating a —1 zone value;

Second Zone: A signal on line 52 indicating a +1 zone value;

Third Zone: A signal on line 58 indicating a —1 zone value;

Fourth Zone: A signal on line 52 indicating a +1 zone value;

Fifth Zone: A signal on line 52 indicating a +1 zone value;

Sixth Zone: A signal on line 58 indicating a —1 zone value;

Seventh Zone: A signal on line 52 indicating a +1 zone value.

These zone values may be verified by checking the zone signal slopes depicted in FIG. 2B–*s* against the value of the normalized integrals of the enhanced signals in FIG. 2B–*w*. It will be observed that wherever the zone signal slope is negative, e.g., the first, third, and sixth zones, the value of the normalized integral of the enhanced zone signal taken at the end of each zone is more negative than —K. Likewise, wherever the zone signal slope is positive, e.g., the second, fourth, fifth, and seventh zones, the value of the normalized integral of the enhanced zone signal taken at the end of each zone is more positive than +K. Although the numeral six does not have any zone signals having a slope of zero, if it did have such, the value of the normalized integral of the enhanced zone signal taken at the end of that particular zone would lie somewhere between +K and —K.

At this point, the reader is once again reminded that regardless of how large the value, positive or negative, of the normalized integral of the enhanced zone signal, a +1 or a —1 signal, respectively, will not be produced on lines 52 and 58, respectively, unless the criterial condition relating to noise has been satisfied. Stated in another way, no zone signal will ever be classified a +1 or —1 if the integral of the absolute zone signal, $\int |a''|dt$, does not exceed a predetermined multiple, some constant, J, of the value of the first character signal peak. Of course, it will be understood by those skilled in the art that the values J and K used in conjunction with the noise criterial condition and the normalizing operation are arbitrary and may be varied depending on the quality of printing of the characters, the parameters of circuits utilized, etc.

While it has been seen how the sequence of zone signals appearing on line *s* are enhanced by multiplier 24 and classified by zone classifying unit 30 according to their zone slopes, it will be remembered that it is the character identifying unit 54 which translates the sequence of zone values indicative of the zone signal slopes of a particular character, in this instance the numeral six, into an output from a particular one of a plurality of logic blocks, said output only being present when the numeral six has been read by the reading head 8. By way of introduction to the description of the operation of the character identifying unit 54 it might be said to comprise two portions: a zone value storing portion wherein the zone values are stored in the latches of FIG. 7 and a combinatorial logic portion wherein the sequence of zone values for the numeral six is converted into an output from a particular one of a plurality of logic blocks. The operation of the former portion will now be discussed.

From the previous discussion it was noted that for the numeral six, outputs from the zone classifying unit 30 will successively appear at the end of each zone on lines 58, 52, 58, 52, 52, 58, and 52, in that order. These outputs correspond to successive zone values of −1, +1, −1, +1, +1, −1, and +1, which as it has been seen are the zone values for the numeral six. Therefore, at the end of the first zone, the output on line 58 corresponding to −1 zone value will be fed to the one AND gate in each group associated with the latch that stores a −1, namely, latches 110c, 120c, 130c, 140c, 150c, 160c, and 170c. However, since this zone value, −1, occurs at the end of the first zone, only one of the AND gates receiving the signal, the AND gate associated with latch 110c, will be enabled because only the position of the ring counter corresponding to line *i* is in the ON condition. Hence, only latch 110c is switched, the switching of a latch being the means by which storage of a zone value is manifested. By the same process, latches 120a, 130c, 140a, 150a, 160c, and 170a are switched in response to the coincidence of pulses on lines 52 and *j* at the end of zone 2, lines 58 and *k* at end of zone 3, lines 52 and *l* at the end of zone 4, lines 52 and *m* at the end of zone 5, lines 58 and *n* at the end of zone 6, and lines 52 and *o* at the end of zone 7, respectively. Thus, the sequence of zone pulses generated in response to reading the numeral six have been stored in the latch arrangement of FIG. 7.

The operation of the second portion of the character identifying unit 54, the combinatorial logic portion, depicted in FIG. 9, will now be dicussed. It will be observed that an output from AND gate 207 corresponding to the numeral six will be obtained only when the numeral six has been read. It is only then that zone values of −1, +1, −1, +1, +1, −1, +1, which have been generated by the zone signal classifying unit 30 and which resulted in the switching of latches 110c, 120a, 130c, 140a, 150a, 160c, and 170a are present and available as inputs to AND gate 207. Only an output from AND gate 207 can be produced in response to the unique combination of zone values produced by reading the numeral six. Thus, the zone values generated by the zone signal classifying unit 30 in response to the enhanced zone signals fed thereto and which were subsequently stored in the zone value storage portion of the character identifying unit 54, have so combined in the combinatorial logic portion of the character identifying unit 54 to produce an output from AND gate 207, the output which indicates the reading of the numeral six.

In the preceding description of the operation of the preferred embodiment, the assumption was made for the purpose of illustration that the character six being read had no printing imperfections and the document feeding apparatus involved no slippage. Therefore, there was no character signal distortion introduced due to timing errors. However, in many instances due to the nature of the character printing and feeding operations, this assumption is not valid and such distortion is present. The following discussion will described the operation of the preferred embodiment when such distortion is present. For purposes of illustration, it will be assumed that a combination of document slippage and character printing irregularities cause the zone signals that are derived from the first and fifth zones to be distorted, that is, the zone signals for these zones are longer than they would be had such timing errors not been present. It will be brought to the reader's attention at this point that the dotted line waveforms of FIGS. 2A and 2B depict the signals present in the circuit of the preferred embodiment as a result of the presence of the above-mentioned distorted character signals. For example, referring to FIG. 2B–*s*, it will be observed that the zone signals for the first and fifth zones (dotted line waveform) extend beyond those of the distortionless zone signals (solid line waveform). This, as was indicated above, is due to the timing errors introduced into the first and fifth zones. The distorted character signal is depicted parallel to the distortionless character signal in zones 2, 3, 4, 6, and 7 inasmuch as there are no timing errors introduced into those zones.

In describing the operation of the preferred embodiment assuming that timing errors are present, it is only necessary to discuss the coaction of the retiming portion of the preferred embodiment with the remainder thereof because it is the only portion which functions in a materially different manner. Specifically, it is only necessary to understand how the generation of the correlation signal is reinitiated in response to retime pulses generated by OR gate 78. Thus, with this information in mind, the operation of the preferred embodiment centering upon the reinitiation of correlation signals in response to retiming pulses will be described.

In determining when the generation of a correlation signal is reinitiated, it is necessary to first determine when retime pulses are generated by the OR gate 78 because the reinitiation of the generation of correlation signals is in response to such retime pulses. It becomes clear that such a retime pulse on line *q* from the OR gate 78 will be produced in response to the presence of an output from either the AND gate 74 or the AND gate 76. Going one step further, it is seen that an output from the AND gate 74 can only be generated when three conditions are concurrently satisfied:

(a) the ring counter position associated with line *i* must be in the ON condition, which it will be observed by referring to FIG. 2B–*i*, occurs during the the second zone;

(b) an input is present on line *r*, said input only being generated by the retime enabling pulse generator 72 during the first half of each zone in a manner to be herein described in detail; and (c) an input signal is present on line 75, said input signal being present whenever a particular character signal peak exceeds the value of the first character signal peak.

Assuming for a moment that there are no timing errors introduced into the zone signal of zone 1, it will be observed that an output will be produced by the AND gate 74, and hence, by the OR gate 78 at the start of zone 2 in coincidence with the second character signal peak. Such an output from the AND gate 74, and hence, from the OR gate 78 on line *q* coincides with end of zone pulse generated by AND gate 28 indicating the end of zone 1 and hence, has no additional effect on the operation of the circuit due to this coincidence. However, in the present example where a timing error is introduced into zone 1, the second signal peak occurs somewhat later in time than it would have had there been no timing error present. Hence, the output from the zone peak comparator 70 on line 75 results in an output being produced from AND gate 74, and hence, OR gate 78, which appears on line *q* and which does not coincide with the associated end of zone pulse as it did in the previous example where no error was assumed and, therefore, serves to reset once again the particular circuit elements which receive such an input on line *q*. In effect, what occurs is that the correlation signal for zone 2 is first initiated by the end of zone pulse generated by AND gate 28 at the end of the first zone. However, the full correlation signal is not thereafter generated as is the case where no errors are present because shortly thereafter the presence of the second character signal peak, delayed by the timing error in zone 1, causes an output from the zone peak comparator 70, which in turn produces outputs from the AND gate 74 and the OR gate 78, to once again reset the respective elements receiving the output. Hence, the generation of the correlation signal is reinitiated to cause the beginning portion thereof to coincide with the beginning portion of the second zone signal thereby re-establishing the state of synchronization between the second correlation signal and the second zone signal.

Referring again to FIG. 2B–*s*, it is seen that there is a second timing error introduced into the character signal. This second timing error is present in the zone signal of the fifth zone with the effect that the sixth character signal peak occurs at a time later than it would if the zone signal for the fifth zone had been of standard length. In a manner similar to that just described with respect to the error signal present in zone 1, a signal is generated in response to the delayed character peak pulse by AND gate 76, and hence, by OR gate 78 on line *q* which serves to reinitiate the generation of the sixth correlation signal, and hence, re-establishes the state of synchronization between the beginning portions of the sixth correlation signal and the sixth zone signal. Stated differently, the sixth character signal peak produces an output from the zone peak comparator 70 on line 75 which occurs at a later time than the end of zone signal following zone 5 thereby producing an output from AND gate 76 and OR gate 78 on line *q* which does not coincide with the end of zone signal generated by AND gate 28 indicating the end of the fifth zone. The result is that the staircase waveform generator 20 and smoothing circuit 23, in addition to the integrators 32 and 36, the zone signal classifying unit 30, and the cascaded binary counter 26, are reset thereby re-establishing synchronization between the beginning portions of the correlation and zone signals for the sixth zone.

The processing of the enhanced zone signal produced by the multiplier 24 in response to the zone signals and reinitiated correlation signals fed thereto is no different from that which was discussed earlier with respect to the operation of the preferred embodiment when the numeral six having no timing error distortion was assumed.

With respect to the eighth position of the ring counter 60 which produces an output on line *p*, it will be observed by referring to FIG. 2B–*p* that this position is never ON during the period immediately following the end of a zone. It will be remembered that it is during the period immediately following the end of a zone that the zone values on lines 52, 56, and 58 are gated to the appropriate latches of FIG. 6. At the end of the seventh zone, the position of the ring counter 60 associated with line *o* is switched to the ON position and fires single-shot 161 thereby gating the seventh zone value to one of the latches of group 170. This counter position will remain in the ON condition even though the entire character has been read until the next pulse is received from AND gate 28. Such a pulse will be produced because the character start trigger 13, which gates the timing pulses, has not been reset at this point. When the pulse from AND gate 28, which is produced by the continued gating of timing pulses following the end of the character, switches the counter 60 a signal is produced on line *p* which serves to indicate that the character reading operation is complete. This pulse, it is seen, will reset the storage element 44 and the character start trigger 13. Resetting of the character start trigger 13 terminates the gating of timing pulses and the generation of pulses from AND gate 28 with the result that the position of the ring counter 60 corresponding to line *p* remains in the ON condition. Having the counter 60 in this condition at the start of a new character is necessary if the first end of the zone pulse for that character produced by AND gate 28 is to have the effect of gating the zone value signals corresponding to the first zone signal to the latches of group 110 shown in FIG. 6.

Considering the operation of the preferred embodiment in light of the two examples just discussed, that is, in light of the processing of the character six with and without timing errors introduced into the character signal, the reader will observe that the operation of the preferred embodiment is substantially the same in both cases. In both cases the document 2, bearing the magnetic character, is drawn past the magnetic write head 4 and the magnetic read head 8 wherein a character signal is generated. In both cases the peak detector 12 generates a peak pulse on line *b* in response to the first character peak which sets the character start trigger 13 thereby gating timing pulses from the timing generator 18 to a staircase waveform generator 20 and the cascaded binary counter 26. In both cases correlation signals are produced by the staircase waveform generator 20 and the smoothing circuit 22 on line *u* in response to every twelve pulses gated by transmission gate 16. In both cases the end of zone pulses are generated by the AND gate 28 in response to a twelve count in the cascaded binary counter 26. In both cases the zone signals are multiplied by correlation signals and thereby enhanced, the enhanced zone signals are integrated in the integrator 32, the integrals of the enhanced zone signals are normalized, appropriate zone values generated depending on the value of the normalized integrals, and the zone values so generated fed to a character identifying unit where an output is produced representative of the particular character read. The difference in the operation of the preferred embodiment in the two cases herein considered, i.e., in the example with timing errors and the example without timing errors lies in the fact that in the case of the distorted signal the generation of the correlation signals and the integration of the enhanced and rectified zone signals were reinitiated during certain zones in response to a retime signal, the retime signal being generated when the duration of the preceding zone signal exceeded in length the duration of a standard zone signal. In the case of the distortionless signal, no reinitiation of the correlation signals nor of the integrators transpired.

While the invention has been particularly shown and described with respect to a preferred embodiment thereof, it will be understood by those skilled in the art that various changes in form and detail may be made therein without departing from the spirit and scope of the invention. For example, the retiming portion of the preferred embodiment may be so designed that retiming will be possible during all zones instead of during just two zones as described herein. Or it may be found desirable to eliminate the retiming portion of the preferred embodiment altogether if the quality of the character printing and feeding apparatus is such that the timing errors introduced into the character signals are of negligible consequence. Additionally, "single gap" optical sensing apparatus, capable of sensing an entire vertical segment of a zone strip, may be used to optically sense the characters and derive characteristic signals therefrom thereby eliminating the need for magnetic read and write heads as well as the need for printing characters with magnetic ink. Also, it may be found desirable in certain circumstances where noise is not a serious problem to classify all the normalized integrals of the enhanced zone signals, that is, generate zone values regardless of whether or not the integral of the absolute zone value exceeds a specified multiple of the first peak pulse. Still under other conditions and circumstances, it may be found desirable where amplitude variations from character to character are of no significance to directly classify the integral of the enhanced zone signal contradistinction to classifying the normalized integral of the enhanced zone signal. That is, it may be found desirable to generate zone values on the basis of the value of the integral of the enhanced zone signal. Additionally, it will be understood by those skilled in the art that the character signals shown accompanying the respective characters are ideal signals and do not generally obtain in practice. Hence, it may be necessary to modify the identification logic of FIG. 9 so as to compensate for this fact. For example, when the fifth zone signal of a particular character is nominally classified as +1, it may be necessary to provide identification logic for that character responsive to a fifth zone value of both +1 and 0. Likewise, where a zone signal is nominally classified as −1, i.e., has a negative slope, it may be necessary to provide identification logic which will assume a +1 zone value has been generated where either a +1 or 0 zone value has been generated. However, such modifications in the identification logic must not be so drastic as to provide no distinction between the sequences of zone values which are used to identify the characters, i.e., they can't be so drastic as to destroy the uniqueness of a particular sequence of zone values used to identify a particular character.

We claim:

1. Apparatus for converting into a useful form characters written in human language in which the characters are divided into a plurality of parallel zone strips, the height of each of said zone strips being approximately equal to the height of the characters, said apparatus comprising:
- a character sensing station having a single gap read head;
- means to move each character relative to said character sensing station whereby said zone strips sequentially traverse said read head;
- means to obtain from said read head a characteristic signal for each character traversing said read head, said characteristic signal comprising a sequence of relatively positive and negative sloping zone signals, each of said zone signals being derived from a single zone strip;
- signal generating means adapted to successively initiate the generation of correlation signals;
- multiplying means for multiplying at least the major portions of said zone signals and said correlation signals;
- integrating means responsive to said multiplying means for integrating the output products of said multiplying means; and
- classification means responsive to said integrating means for classifying the integrals of the output products according to their respective values.

2. Apparatus for converting into a useful form characters written in human language in which the characters are divided into a plurality of parallel zone strips, the height of each of said zone strips being approximately equal to the height of the characters, said apparatus comprising:
- a character sensing station having a single gap read head;
- means to move each character relative to said character sensing station whereby said zone strips sequentially traverse said read head;
- means to obtain from said read head a characteristic signal for each character traversing said read head, said characteristic signal comprising a sequence of relatively positive and negative sloping zone signals, each of said zone signals being derived from a single zone strip;
- detecting means operative in response to changes in slope of said characteristic signal for providing peak pulses corresponding to characteristic signal peaks;
- signal generating means adapted to successively initiate the generation of correlation signals in response to successive peak pulses;
- multiplying means for multiplying at least the major portions of said zone signals and said correlation signals;
- integrating means responsive to said multiplying means for integrating the output products of said multiplying means; and
- classification means responsive to said integrating means for generating a first pulse in response to an integral of the output product exceeding a specified positive value, a second pulse in response to an integral of the output product exceeding a specified negative value and a third pulse in response to an integral of the output product of approximately zero value, said pulses collectively being representative of the character sensed.

3. Apparatus for converting into a useful form characters written in human language in which the characters are divided into a plurality of parallel zone strips, the height of each of said zone strips being approximately equal to the height of the characters, said apparatus comprising:
- a character sensing station having a single gap read head;
- means to move each character relative to said character sensing station whereby said zone strip sequentially traverse said read head;
- means to obtain from said read head a characteristic signal for each character traversing said read head, said characteristic signal comprising a sequence of relatively positive and negative sloping zone signals, each of said zone signals being derived from a single zone strip;
- detecting means operative in response to changes in slope of said characteristic signal for providing peak pulses corresponding to characteristic signal peaks and for providing an output representative of the magnitude of the first characteristic signal peak;
- signal generating means adapted to successively initiate the generation of correlation signals in response to successive peak pulses;
- multiplying means for multiplying at least the major portions of said zone signals and said correlation signals;
- integrating means for integrating the output product of said multiplying means;
- zone integrating means for integrating the absolute value of said zone signal providing a zone integral signal; and
- classification means for generating a first pulse in response to an integral of an output product exceeding a specified positive value, a second pulse in response to an integral of an output product exceeding a specified negative value and a third pulse in response to an integral of an output product of approximately zero value, said pulses which collectively represent the character sensed only being generated when said zone integral signal exceeds a specified multiple of said output representative of said first character signal peak.

4. Apparatus for converting into a useful form characters written in human language in which the characters are divided into a plurality of parallel zone strips, the height of each of said zone strips being approximately equal to the height of the characters, said apparatus comprising:
- a character sensing station having a single gap read head;
- means to move each character relative to said character sensing station whereby said zone strips sequentially traverse said read head;
- means to obtain from said read head a characteristic signal for each character traversing said read head, said characteristic signal comprising a sequence of relatively positive and negative sloping zone signals, each of said zone signals, being derived from a single zone strip;
- detecting means operative in response to characteristic signal peaks for providing pulses corresponding to said peaks;
- signal generating means for generating correlation signals in response to successive characteristic signal peak pulses;
- means for successively multiplying the major portion of each of said zone signals by one of said successively generated correlation signals;
- integrating means for integrating the output product of said multiplying means;
- zone integrating means for integrating the absolute values of said zone signals providing a zone integral signal; and
- classification means for generating a first pulse in response to positive integrals of the output products exceeding in value a specified multiple of the associated zone integral signal, a second pulse in response to negative integrals of the output products exceeding in value a specified multiple of the associated zone integral signal, and a third pulse in response to integrals of the output products of approximately zero value, said pulses collectively being representative of the character sensed.

5. The apparatus of claim 4 wherein said detecting means further provides an output representative of the first character signal peak and wherein said classification means is operative to generate said pulses only when said zone integral signals exceed a specified multiple of said signal representative of said first characteristic signal peak.

6. Apparatus for converting into a useful form characters written in human language in which the characters are divided into a plurality of parallel zone strips having a height approximately equal to the height of the characters and are printed with magnetic ink, said apparatus comprising:

a character sensing station having a single gap read head;

means to move each character relative to said character sensing station whereby said zone strips sequentially traverse said read head;

means to obtain from said read head a characteristic signal for each character traversing said read head, said characteristic signal comprising a sequence of relatively positive and negative sloping zone signals, each of said zone signals being derived from a single zone strip;

detecting means operative in response to the first peak of said characteristic signal for providing a character start pulse;

timing means responsive to said character start pulse for establishing successive equally spaced zone start pulses;

signal generating means adapted to successively generate correlation signals in response to successive zone start pulses;

multiplying means for successively multiplying the major portion of each of said zone signals by one of said successively generated correlation signals;

integrating means for successively integrating the output product of said multiplying means; and classification means for generating a first pulse in response to an integral of the output product exceeding a specified positive value, a second pulse in response to an integral of the output product exceeding a specified negative value, and a third pulse in response to an integral of the output product of approximately zero value, said pulses collectively being representative of said character sensed.

7. Apparatus for converting into a useful form characters written in human language in which the characters are divided into a plurality of parallel zone strips having a height approximately equal to the height of the characters and are written with magnetic ink, said apparatus comprising:

a character sensing station having a single gap read head;

means to move each character relative to said character sensing station whereby said zone strips sequentially traverse said read head;

means to obtain from said read head a characteristic signal for each character traversing said read head, said characteristic signal comprising a sequence of relatively positive and negative sloping zone signals, each of said zone signals being derived from a single zone strip;

detecting means operative in response to the first peak of said characteristic signal for providing a character start pulse;

timing means responsive to said character start pulse for establishing successive equally spaced zone start pulses;

zone integrating means for sequentially integrating the absolute values of said zone signals providing a zone integral signal;

signal generating means adapted to successively generate correlation signals in response to successive zone start pulses;

multiplying means for successively multiplying the major portion of each of said zone signals by one of said successively generated correlating signals;

integrating means for successively integrating the output product of said multiplying means; and classification means for generating a first pulse in response to positive integrals of the output products exceeding in value a specified multiple of the associated zone integral signal, a second pulse in response to negative integrals of the output products exceeding in value a specified multiple of the associated zone integral signal, and a third pulse in response to integrals of the output products of approximately zero value, said pulses collectively being representative of the character sensed.

8. The apparatus of claim 7 wherein said detecting means further provides an output representative of the magnitude of the first character signal peak and wherein said classification means is operative to generate said pulses only when said zone integral signal exceeds a specified multiple of said signal representative of said first characteristic signal peak.

9. Apparatus for converting into a useful form characters written in human language in which the characters are divided into a plurality of parallel zone strips having a height approximately equal to the height of the characters and are written in magnetic ink, said apparatus comprising:

a character sensing station having a single gap read head;

means to move each character relative to said character sensing station whereby said zone strips sequentially traverse said read head;

means to obtain from said character sensing station a characteristic signal for each character traversing said read head, said characteristic signal comprising a sequence of relatively positive and negative sloping zone signals, each of said zone signals being derived from a single zone strip;

detecting means operative in response to the first peak of said characteristic signal for providing a character start pulse and for providing an output signal representative of the magnitude of the first characteristic signal peak;

timing means responsive to said character start pulse for establishing successive equally spaced zone start pulses;

zone integrating means for sequentially integrating the absolute values of said zone signals providing a zone integral signal;

signal generating means adapted to successively generate correlation signals in response to successive zone start pulses;

means for successively multiplying the major portion of each of said zone signals by one of said successively generated correlation signals;

integrating means for successively integrating the output product of said multiplying means; and classification means for generating a first pulse in response to an integral of an output product exceeding a specified positive value, a second pulse in response to an integral of an output product exceeding a specified negative value and a third pulse in response to an integral of an output product of approximately zero value, said pulses which collectively represent the character sensed only being generated when said zone integral signal exceeds a specified multiple of said output representative of said first characteristic signal peak.

10. Apparatus for converting into a useful form characters written in human language in which the characters are divided into a plurality of parallel zone strips having a height approximately equal to the height of the characters, said apparatus comprising:

a character sensing station having a single gap read head;

means to move each character relative to said character sensing station whereby said zones sequentially traverse said read head;

means to obtain from said read head a characteristic signal for each character traversing said read head, said characteristic signal comprising a sequence of relatively positive and negative sloping zone signals, each of said zone signals being derived from a single zone strip;

a detector responsive to the peaks of said characteristic signals for providing peak pulses corresponding to said characteristic signal peaks;

timing means responsive to said first peak pulse for establishing successive equally spaced zone start pulses;

signal generating means adapted to successively initiate the generation of correlation signals in response to successive zone start pulses, said signal generating means also being adapted to successively initiate the generation of correlation signals in response to selected peak pulses;

multiplying means for multiplying at least the major portions of said zone signals and said correlation signals;

integrating means for integrating the output product of said multiplying means; and classification means for generating a first pulse in response to an integral of the output product exceeding a specified positive value, a second pulse in response to an integral of the output product exceeding a specified negative value, and a third pulse in response to an integral of the output product of approximately zero value, said pulses collectively being representative of the character sensed.

11. Apparatus for converting into a useful form characters written in human language in which the characters are divided into a plurality of parallel strips having a height approximately equal to the height of the characters, said apparatus comprising:

a character sensing station having a single gap read head;

means to move each character relative to said character sensing station whereby said zone sequentially traverses said read head;

means to obtain from said read head a characteristic signal for each character traversing said read head, said characteristic signal comprising a sequence of relatively positive and negative sloping zone signals, each of said zone signals being derived from a single zone strip;

zone integrating means for integrating the absolute values of said zone signals providing a zone integral signal;

a detector responsive to the peaks of said characteristic signals for providing peak pulses corresponding to said characteristic signal peaks;

timing means responsive to said first peak pulse for establishing successive equally spaced zone start pulses;

signal generating means adapted to successively initiate the generation of correlation signals in response to successive zone start pulses, said signal generating means also being adapted to successively initiate the generation of correlation signals in response to selected peak pulses;

multiplying means for multiplying at least the major portions of said zone signals and said correlation signals;

integrating means for integrating the output product of said multiplying means; and classification means for generating a first pulse in response to positive integrals of the output products which exceed a specified multiple of said associated zone integral signal, a second pulse in response to negative integrals of the output products which exceed a specified multiple of said associated zone integral signal, and a third pulse in response to integrals of the output products of approximately zero value, said pulses collectively being representative of the character sensed.

12. The apparatus of claim 11 wherein said classification means is operative to produce said pulses only when said zone integral signal exceeds a specified multiple of said signal representative of said first characteristic signal peak.

13. Apparatus for converting into a useful form characters written in human language in which the characters are divided into a plurality of parallel zone strips having a height approximately equal to the height of the characters, said apparatus comprising:

a character sensing station having a single gap read head;

means to move each character relative to said character sensing station whereby said zone strips sequentially traverse said read head;

means to obtain from said character sensing station a characteristic signal for each character traversing said read head, said characteristic signal comprising a sequence of relatively positive and negative sloping zone signals, each of said zone signals being derived from a single zone strip;

zone integrating means for integrating the absolute values of said zone signals providing a zone integral signal;

a detector responsive to the peaks of said character signals for providing peak pulses corresponding to said characteristic signal peaks and for providing an output signal representative of the magnitude of the first characteristic signal peak;

timing means responsive to said first peak pulse for establishing successive equally spaced zone start pulses;

signal generating means adapted to successively initiate the generation of correlation signals in response to successive zone start pulses, said signal generating means also being adapted to successively initiate the generation of correlation signals in response to selected peak pulses;

multiplying means for multiplying at least the major portions of said zone signals and said correlation signals;

integrating means for integrating the output product of said multiplying means; and classification means for generating a first pulse in response to an integral of an output product exceeding a specified positive value, a second pulse in response to an integral of an output product exceeding a specified negative value, and a third pulse in response to an integral of an output product of approximately zero value, said pulses which collectively represent the character sensed being generated only if the zone integral signal exceeds a specified multiple of said output signal representative of the magnitude of said first characteristic signal peak.

14. A character recognition system for converting to a useful form characters written in human language in which the characters are divided into a plurality of parallel zone strips, said apparatus comprising:

a character sensing station having a single gap read head;

means to move each character relative to said character sensing station whereby said zone strips sequentially traverse said read head;

means to obtain from said read head a characteristic signal for each character traversing said read head, said characteristic signal comprising a sequence of relatively positive and negative sloping zone signals, each of said zone signals being derived from a single zone strip;

detecting means operative in response to changes in slope of said characteristic signal for providing peak pulses corresponding to characteristic signal peaks;

timing means responsive to the first peak pulse of said detecting means for generating a continuous sequence of timing signals defining each zone strip;

retiming means responsive to said detecting means when a subsequent output from the detecting means is not coincident with a predetermined one of said timing signals causing said timing means to skip to a different point in said timing sequence;

classification means responsive to said zone signals and to said timing means for classifying said characters in accordance with the sequence of zone signals detected.

15. In a character recognition system wherein the segments of an analog waveforms generated by scanning a character are analyzed to develop a digital output signal representative of said character, the combination comprising:

peak sensing means receiving said analog waveform and generating output signals in response to peak amplitudes occurring in said waveforms;

timing means responsive to the output signal from said peak sensing means corresponding to the leading edge of said character for generating a continuous sequence of timing signals defining a plurality of character scan segments; and retiming means responsive to a subsequent output from said peak sensing means which is noncoincident with a predetermined one of said timing signals for causing said timing means to skip to a different point in said timing sequence;

analyzing means responsive to said timing means for classifying the character in accordance with the sequence of segments detected during said plurality of character scan segments.

References Cited by the Examiner

UNITED STATES PATENTS

| | | | |
|---|---|---|---|
| 3,114,131 | 12/1963 | Furr et al. | 340—146.3 |
| 3,191,149 | 6/1965 | Andrews | 340—146.3 |
| 3,246,293 | 4/1966 | Shelton | 340—146.3 |

DARYL W. COOK, *Acting Primary Examiner.*

MAYNARD R. WILBUR, J. E. SMITH, J. I. SCHNEIDER, *Assistant Examiners.*

UNITED STATES PATENT OFFICE

CERTIFICATE OF CORRECTION

Patent No. 3,316,536 April 25, 1967

Douglas R. Andrews et al.

It is hereby certified that error appears in the above numbered patent requiring correction and that the said Letters Patent should read as corrected below.

Column 9, line 16, before "a determination" insert -- facilitates --; column 18, line 67, for "51" read -- s --; column 19, line 62, for "j" read -- J --; column 31, line 8, after "of the" insert -- magnitude of the --; column 32, line 8, for "correlating" read -- correlation --.

Signed and sealed this 21st day of November 1967.

(SEAL)
Attest:

Edward M. Fletcher, Jr.
Attesting Officer

EDWARD J. BRENNER
Commissioner of Patents